US009739004B2

(12) United States Patent
Ha et al.

(10) Patent No.: US 9,739,004 B2
(45) Date of Patent: Aug. 22, 2017

(54) HOME APPLIANCE, HOME APPLIANCE SYSTEM AND METHOD OF CONTROLLING HOME APPLIANCE

(71) Applicant: LG ELECTRONICS INC., Seoul (KR)

(72) Inventors: Mikyung Ha, Changwon-si (KR); Junpil Park, Changwon-si (KR); Byunggee Sung, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/916,531

(22) PCT Filed: Sep. 4, 2014

(86) PCT No.: PCT/KR2014/008301
§ 371 (c)(1),
(2) Date: Mar. 3, 2016

(87) PCT Pub. No.: WO2015/034278
PCT Pub. Date: Mar. 12, 2015

(65) Prior Publication Data
US 2016/0215430 A1    Jul. 28, 2016

(30) Foreign Application Priority Data

Sep. 4, 2013    (KR) ........................ 10-2013-0106326

(51) Int. Cl.
*D06F 33/02*    (2006.01)
*G08C 17/02*    (2006.01)
(Continued)

(52) U.S. Cl.
CPC ............. *D06F 33/02* (2013.01); *G08C 17/02* (2013.01); *H04B 1/3833* (2013.01);
(Continued)

(58) Field of Classification Search
None
See application file for complete search history.

(56) References Cited

U.S. PATENT DOCUMENTS 6,882,712 B1 *    4/2005    Iggulden ............. H04L 12/2814
                                                              379/102.01
7,174,227 B2 *    2/2007    Kobayashi ............ D06F 39/005
                                                              700/83
(Continued)

FOREIGN PATENT DOCUMENTS

EP    2 611 079    12/2012
EP    2 573 247    3/2013
(Continued)

OTHER PUBLICATIONS

International Search Report and Written Opinion dated Jan. 12, 2015 issued in Application No. PCT/KR2014/008301 (Full English Text).

(Continued)

*Primary Examiner* — K. Wong
(74) *Attorney, Agent, or Firm* — Ked & Associates, LLP

(57) ABSTRACT

Disclosed is a home appliance system including a home appliance and a mobile terminal. The home appliance includes a tag unit, a communication unit, a memory, a display unit, an input unit, a drive control unit and a controller to control general operations of the home appliance, the home appliance including a washing machine. The mobile terminal includes a communication unit, a storage unit, a display unit, an input unit, a speaker and a terminal controller.

20 Claims, 18 Drawing Sheets

(51) Int. Cl.
    *H04L 12/28*     (2006.01)
    *H04B 1/3827*     (2015.01)
    *D06F 39/00*     (2006.01)
    *D06F 35/00*     (2006.01)

(52) U.S. Cl.
    CPC ........ *H04L 12/282* (2013.01); *H04L 12/2823* (2013.01); *H04L 12/2834* (2013.01); *D06F 35/008* (2013.01); *D06F 39/005* (2013.01); *D06F 2202/04* (2013.01); *D06F 2202/065* (2013.01); *D06F 2202/085* (2013.01); *D06F 2202/12* (2013.01); *D06F 2204/06* (2013.01); *D06F 2204/10* (2013.01); *D06F 2210/00* (2013.01); *D06F 2214/00* (2013.01); *D06F 2216/00* (2013.01); *G08C 2201/91* (2013.01); *G08C 2201/93* (2013.01); *H04L 2012/285* (2013.01); *H04L 2012/2841* (2013.01)

(56) References Cited

U.S. PATENT DOCUMENTS

| | | | | |
|---|---|---|---|---|
| 7,340,509 | B2 * | 3/2008 | Daum | H04L 12/2803 709/220 |
| 7,373,737 | B2 * | 5/2008 | Lyu | D06F 29/00 34/595 |
| 8,509,922 | B2 * | 8/2013 | Yum | H04L 12/2809 700/17 |
| 8,667,112 | B2 * | 3/2014 | Roth | H04L 12/282 709/206 |
| 9,294,575 | B1 * | 3/2016 | Cronin | H04L 67/20 |
| 9,407,330 | B2 * | 8/2016 | Jeon | H04B 5/0031 |
| 2010/0286801 | A1 | 11/2010 | Yum et al. | |
| 2012/0023212 | A1 | 1/2012 | Roth et al. | |
| 2013/0173811 | A1 * | 7/2013 | Ha | H04W 76/02 709/227 |
| 2013/0214935 | A1 | 8/2013 | Kim et al. | |
| 2014/0236328 | A1 | 8/2014 | Kamon et al. | |

FOREIGN PATENT DOCUMENTS

| | | |
|---|---|---|
| WO | WO 2013/015656 A2 | 1/2013 |
| WO | WO 2013/035242 | 3/2013 |
| WO | WO 2013/089713 A1 | 6/2013 |

OTHER PUBLICATIONS

European Search Report dated Feb. 20, 2017 issued in Application No. 14841508.6.

* cited by examiner

HOME APPLIANCE, HOME APPLIANCE SYSTEM AND METHOD OF CONTROLLING HOME APPLIANCE

CROSS-REFERENCE TO RELATED PATENT APPLICATIONS

This application is a U.S. National Stage Application under 35 U.S.C. §371 of PCT Application No. PCT/KR2014/008301, filed Sep. 4, 2014, which claims priority to Korean Patent Application No. 10-2013-0106326, filed Sep. 4, 2013, whose entire disclosures are hereby incorporated by reference.

TECHNICAL FIELD

The present invention relates to a home appliance, a home appliance system and a method of controlling the home appliance.

BACKGROUND ART

In general, home appliances refer to electronics products used at home, such as laundry treatment apparatuses, air conditioners, image display apparatuses, refrigerators and the like.

Explaining laundry treatment apparatuses as one example of home appliances, laundry treatment apparatuses generally include washing machines, drying machines, combined washing and drying machines and the like.

Washing machines are apparatuses that perform washing, rinsing, dehydration and the like to remove contaminants adhered to laundry, such as clothing, bedding and the like using water, detergent and mechanical operations. These washing machines are classified into top load type washing machines in which a drum receiving laundry is rotated about a vertical axis and front load type washing machines in which a drum receiving laundry is rotated about a horizontal axis.

Drying machines are apparatuses that dry an object by supplying hot air thereto. In the drying machines, an object to be dried is introduced into a rotatable drum and hot air or cold air is supplied to the drum to dry the object during rotation of the drum.

Combined washing and drying machines have both a washing function and a drying function and are apparatuses in which laundry, such as clothing and the like, is introduced into a rotatable drum and washing or drying of the laundry is performed as a user selects a desired function.

Conventional home appliances have been devised to be operated upon receiving user input via a user input unit included therein.

However, user interfaces incorporated in conventional home appliances used at home need to be operated on a per product basis and, in turn, users must inconveniently need to know product instructions on a per home appliance basis.

DISCLOSURE OF INVENTION

Technical Problem

Therefore, the present invention has been made in view of the above problems, and it is an object of the present invention to provide a home appliance, a home appliance system and a method of controlling the home appliance, in which operation of the home appliance is controlled using a mobile terminal that communicates with the home appliance when coming into contact with the home appliance.

Objects of the present invention are not limited to the aforementioned object and other unmentioned objects will be clearly understood from the following description by those skilled in the art.

Solution to Problem

In accordance with one embodiment of the present invention, the above and other objects can be accomplished by the provision of a home appliance including a tag unit, a communication unit, a memory, a display unit, an input unit, a drive control unit and a controller to control general operations of the home appliance, the home appliance including a washing machine.

In accordance with another embodiment of the present invention, a home appliance system includes a home appliance as described above, and a mobile terminal including a communication unit, a storage unit, a display unit, an input unit, a speaker and a terminal controller.

Details of other embodiments are included in the following detailed description and the accompanying drawings.

BRIEF DESCRIPTION OF DRAWINGS

The above and other objects, features and other advantages of the present invention will be more clearly understood from the following detailed description taken in conjunction with the accompanying drawings, in which:

FIGS. 8 to 16 are views explaining a method of controlling the washing machine using the mobile terminal according to an embodiment of the present invention;

BEST MODE FOR CARRYING OUT THE INVENTION

It will be understood that, although the terms first, second, etc. may be used herein to describe various elements, these elements should not be limited by these terms. The above terms are used simply to discriminate any one element from other elements. For example, without departing from the scope of the present invention, "first contact" may be called "second contact" and, likewise, "second contact" may be called "first contact". Both "first contact" and "second contact" refer to contact, but may not be the same contact.

Terms used in the description of the invention are given only to explain specific embodiments and are not intended to limit the invention. When used in the description of the invention and the accompanying claims, of course, singular forms are intended to include plural forms unless context clearly indicates otherwise. The use of marks may indicate any one or both of the singular forms and the plural forms of the terms, and vice versa.

It will be understood that the term "and/or" refers to one or more possible combinations of specified relevant items and includes such combinations. It will be further understood that the terms "comprises" and/or "comprising" used in this specification designate presence of specified features, integers, steps, operations, elements, and/or components but do not exclude presence or addition of one or more other features, integers, steps, operations, elements, components, and/or groups thereof.

The term "if" may be interpreted to mean "when" or "upon" or "in response to determining" or "in response to detecting" from the context. In the same manner, the phrases "in a determined case" or "in a case in which [a specified condition or event] is detected" may be interpreted to mean "upon determining", "in response to determining", "upon detecting [a specified condition or event]" or "in response to detecting [a specified condition or event]" from the context.

Hereinafter, embodiments of computing devices, user interfaces for these devices and related processes for use of these devices will be described.

Reference will now be made in detail to the embodiments of the present invention, examples of which are illustrated in the accompanying drawings. In the following description of the embodiments of the present invention, although a laundry treatment apparatus will be described as one example of a home appliance, it will be understood that the following description should not be limited thereto and may be exclusively or non-exclusively applied to other appliances including an air conditioner, an image display apparatus, a refrigerator and the like within the scope of teachings of the present invention.

Figure 1:
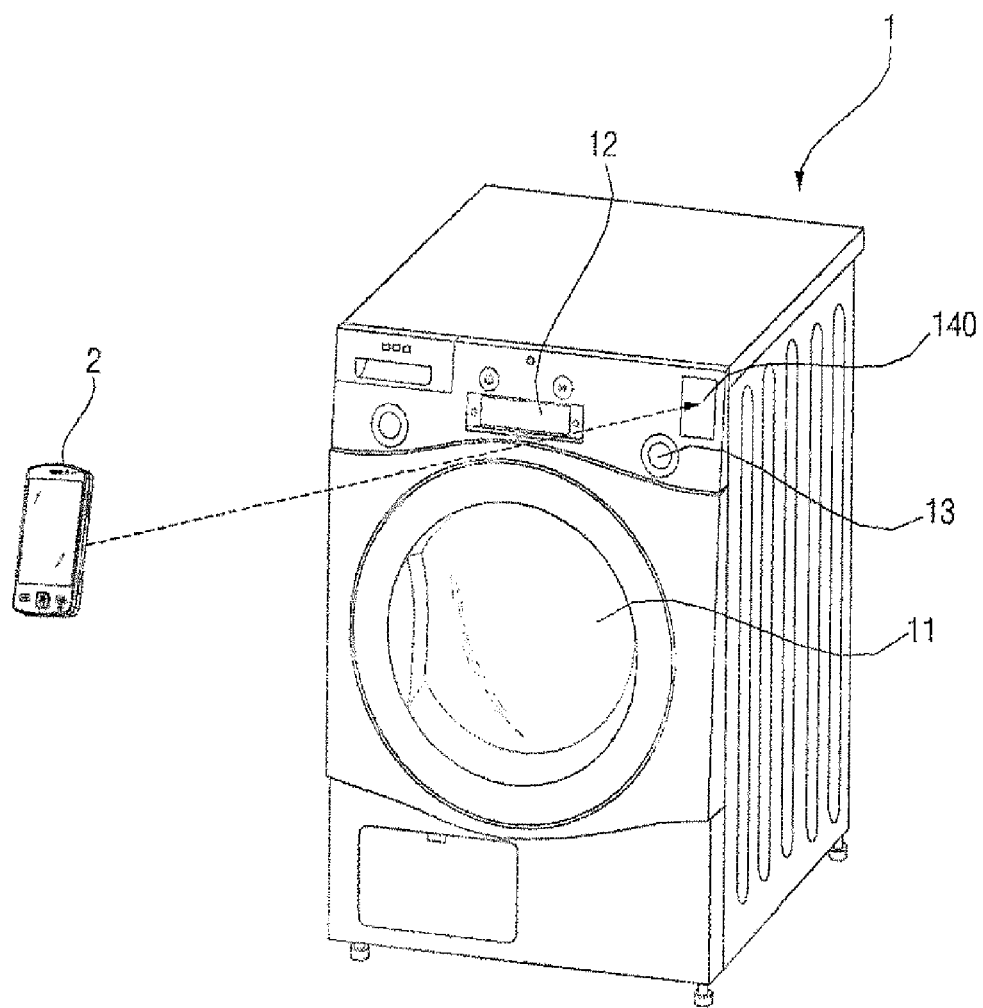
FIG. 1 is a view showing a configuration of a washing machine system including a washing machine and a mobile terminal according to an embodiment of the present invention.

FIG. 1 is a view showing a configuration of a washing machine system including a washing machine and a mobile terminal according to an embodiment of the present invention.

The present embodiment describes a washing machine by way of example, but is not limited thereto.

Referring to FIG. 1, a washing machine system of the present invention includes a washing machine 1 and a mobile terminal 2 that communicates with the washing machine 1 using Near Field Communication (NFC).

The washing machine 1 includes a tag unit 140 that stores data including product information and operational state or breakdown information regarding the washing machine 1 and performs data transmission/reception with the mobile terminal 2 via near field communication. In this case, the tag unit 140 performs data transmission/reception with the mobile terminal 2 when the mobile terminal 2 comes into contact with the tag unit 140 or comes within a prescribed distance of the tag unit 140. In some cases, the tag unit 140 may be detachably attached to the washing machine 1.

In addition, the washing machine 1 includes a display unit 12 that displays various information regarding operational states and operation setting of the washing machine 1, an input unit 13 to input operation setting, and a door 11 for introduction of laundry, such as clothing and the like, into the washing machine 1.

The display unit 12 may be a Liquid Crystal Display (LCD) or Light Emitting Diode (LED) unit and, in some cases, may be a touchscreen without being limited thereto. The input unit 13 may include one or more buttons or switches, and may include a touch pad through which data is input via touch action. When the display unit 12 includes a touchscreen, the touchscreen may also function as an input unit.

The washing machine 1 includes a drum rotatably placed in a case that defines an external appearance of the washing machine 1, and the drum is configured to receive laundry, such as clothing and the like, therein. Lifters are arranged at an inner circumferential surface of the drum and serve to lift and drop clothing as the drum is rotated, which provides easy removal of contaminants from laundry. In addition, the washing machine 1 may include, for example, a plurality of sensors to sense water supply, drainage and other operational states.

The mobile terminal 2 includes a communication module for data transmission/reception with the tag unit 140 of the washing machine 1 via near field communication. The mobile terminal 2 further includes an input unit to transmit specific data to the washing machine 1 and a display unit to display data of the washing machine 1.

The mobile terminal 2 functions to receive data of the washing machine 1 via the communication module thereof by coming into contact with the tag unit 140 of the washing machine 1 and to allow data stored in the mobile terminal 2 to be recorded and stored in the tag unit 140. In this case, the mobile terminal 2 may perform data transmission/reception via single contact with the tag unit 140 of the washing machine 1. Here, the term "contact" refers to not only physical contact between the mobile terminal 2 and the tag unit 140, but also the case in which the mobile terminal 2 comes within a prescribed distance of the tag unit 140 to enable mutual recognition and, in turn, data transmission/reception even if no physical contact occurs.

The mobile terminal 2 includes an application for data transmission/reception with the washing machine 1 and control of the washing machine 1. Through execution of the application, the mobile terminal 2 may display information of the washing machine 1 received via contact with the tag unit 140, may control the washing machine 1, and may determine whether the washing machine 1 has malfunctioned.

Figure 2:
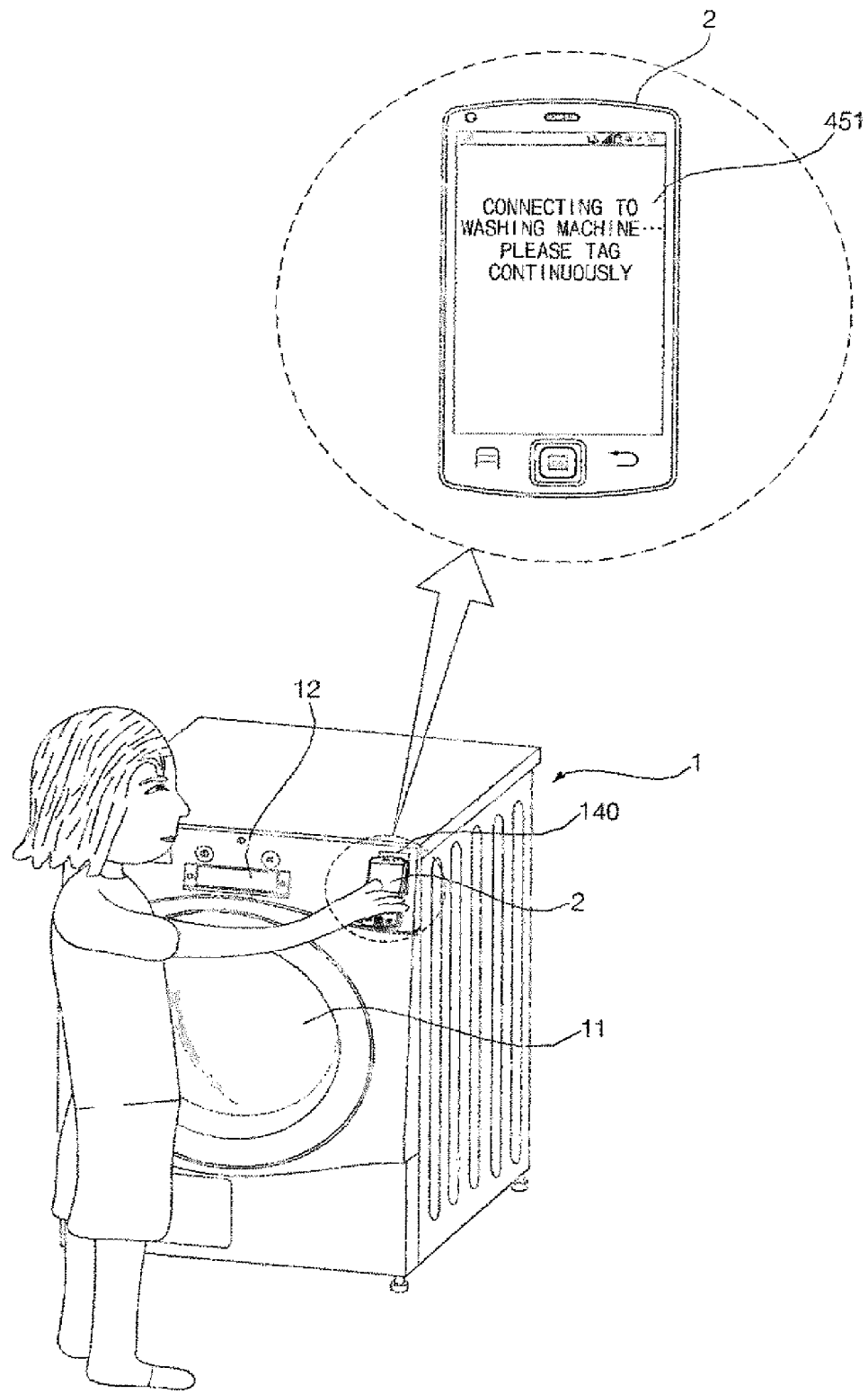
FIG. 2 is a view showing an example of communication via contact between the mobile terminal and the washing machine according to an embodiment of the present invention.

FIG. 2 is a view showing an example of communication via contact between the mobile terminal and the washing machine according to an embodiment of the present invention.

Referring to FIG. 2, a user may check information of the washing machine 1 via the mobile terminal 2 by bringing the mobile terminal 2 into contact with the tag unit 140 of the washing machine 1 or by bringing the mobile terminal 2 within a prescribed distance of the tag unit 140.

When a state in which the mobile terminal 2 comes into contact with the tag unit 140 of the washing machine 1 or comes within a prescribed distance of the tag unit 140 is continued for a prescribed time or more, the mobile terminal 2 receives data stored in the tag unit 140 of the washing machine 1 and, simultaneously, transmits setting data regarding the washing machine 1 to the tag unit 140 to store the data in the tag unit 140.

In this case, a screen 451 of the display unit included in the mobile terminal 2 displays a guide instruction to maintain such a contact state for a prescribed time required for data transmission/reception with the washing machine 1. The guide instruction may be displayed as letters or images and, simultaneously, may be output as voice.

After data transmission/reception is completed, the mobile terminal 2 may display a guide instruction to indicate completion of communication on the screen 451, or may output prescribed sound effect via a speaker.

Figure 3:
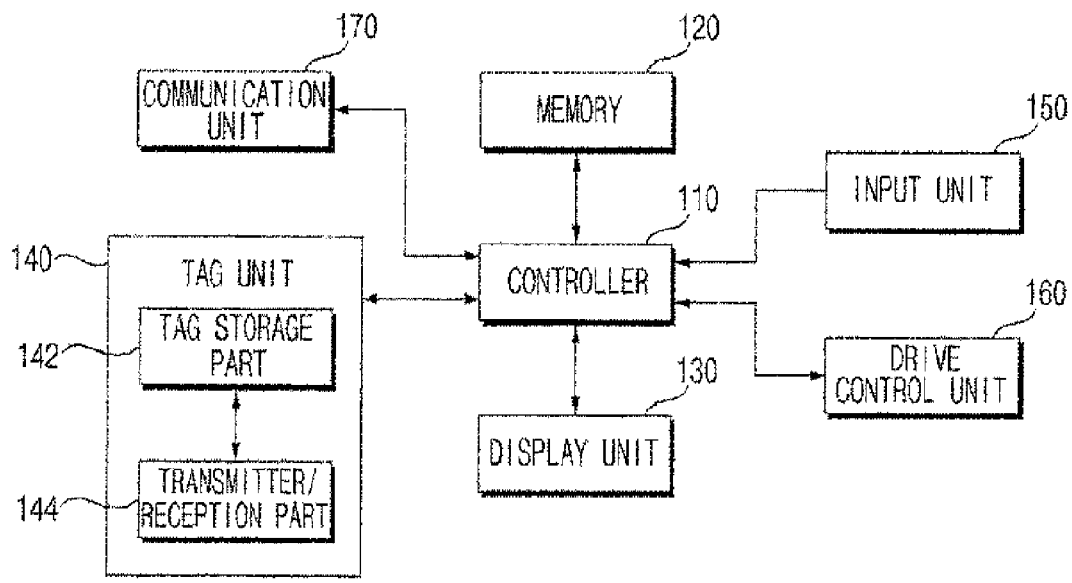
FIG. 3 is a block diagram showing a configuration of the washing machine according to an embodiment of the present invention.

FIG. 3 is a block diagram showing a configuration of the washing machine according to an embodiment of the present invention.

Referring to FIG. 3, the washing machine 1 includes the tag unit 140 as described above, and further includes a communication unit 170, a memory 120, a display unit 130, an input unit 150, a drive control unit 160 and a controller 110 to control general operations of the washing machine 1.

In addition, the washing machine 1 may further include a sensing unit (not shown) comprised of a plurality of sensors to sense a state of the washing machine 1 and a power source unit (not shown). In this case, the sensing unit includes sensors to sense temperature, pressure, voltage, current, water level, revolutions per minute and the like, and transmits sensed or measured data to the controller 110. For example, the sensing unit measures a level of water during water supply or drainage of the washing machine 1, and also measures a temperature of water supplied, revolutions per minute of a wash tub or drum and the like.

The drive control unit 160 controls driving in response to a control signal applied from the controller 110 to assist the washing machine 1 in performing a predetermined operation. As such, the washing machine 1 performs a series of strokes, such as a washing stroke, a rinsing stroke and a dehydration stroke to remove contaminants from laundry.

The drive control unit 160 controls a motor to rotate the drum in response to a control command from the controller 110.

The memory 120 stores control data for operation control of the washing machine 1, operating data based on courses or programs of the washing machine 1, setting data input via the input unit 150, interface data for storage of information displayed on a screen of the display unit 130, measured data sensed during operation of the washing machine 1, and breakdown data regarding malfunction.

In addition, the memory unit 120 stores data input from the mobile terminal 2 via the tag unit 140 and connection data for connection with a server.

In this case, the memory 120 may include, but is not limited thereto, one or more of a magnetic disc storage device, a flash memory device, or a non-volatile memory, such as other non-volatile solid-phase memory device or the like, and may further include other readable storage media.

For example, the memory 120 may include an Electronically Erasable and Programmable Read Only Memory (EEPROM) without being limited thereto. The EEPROM may be used to record and eliminate information by a terminal controller 210. The EEPROM may be a memory device in which stored information remains even if a power source is disconnected to stop supply of power.

The input unit 150 includes at least one input means with which a user inputs a prescribed signal or data to the washing machine 1. The input unit 150 receives data, such as an operation course and setting based on operation of the washing machine 1 and transmits the data to the controller 110.

The input unit 150 may include one or more buttons, a dome switch, a touch pad (static pressure/electrostatic), a jog wheel, a jog switch, a finger mouse, a rotary switch, a jog dial and the like. Of course, any other device may be applied so long as it generates prescribed input data via manual operation, such as pushing, rotation, pressure, contact and the like.

The display unit 130 displays information input via the input unit 150 and operating information and state information of the washing machine 1 in response to a control command of the controller 110. The display unit 130 may display a connection state in response to the control command of the controller 110 upon contact between the mobile terminal 2 and the tag unit 140, and may display a connection state caused when the washing machine 1 is connected to a network based on predetermined connection information.

The display unit 130 has a self-illumination function like LEDs, LCDs and organic ELs, and visually displays state information or failure information of the washing machine 1. In this case, the display unit 130 displays information of the washing machine 1 in the form of at least one of images, numbers and special characters.

In addition to the display unit 130, the washing machine 1 further includes output means, such as a lamp or a flasher, a vibrating element, a speaker and the like.

The communication unit 170 includes at least one wired or wireless communication module and is connected to a network based on connection setting to perform data transmission/reception. The communication unit 170 may perform data transmission/reception with a server 3 upon network connection, and may transmit data of the washing machine 1 to the mobile terminal 2 in response to a request of the mobile terminal 2. In this case, the communication unit 170 may be connected to the server 3 based on native information of the washing machine 1 and may perform data transmission/reception via user authorization using an identification (ID) when connected to the mobile terminal 2.

The controller 110 controls data input/output by the input unit 150 and the display unit 130, manages data of the memory 120, and controls data transmission/reception by the communication unit 170 and the tag unit 140.

The controller 110 stores data of the washing machine 1 in the tag unit 140, and calls data recorded in the tag unit 140 to change and control setting of the washing machine 1. The controller 110 checks a state of the tag unit 140 to read or record data.

The controller 110 checks whether the tag unit 140 is connected to the mobile terminal 2 based on flag setting of the tag unit 140, and judges whether new data is present. The controller 110 may check whether the tag unit 140 is connected to the mobile terminal 2 based on flag setting and check a state of data by reading header data of the tag unit 140.

When the tag unit 140 is in a standby state, the controller 110 reads data stored in the tag unit 140 and then resets a state of the tag unit 140. When data of the washing machine 1 is produced, the controller 110 stores the data in the tag unit 140. For example, upon occurrence of an error in the washing machine 1, the controller 110 records resultant diagnosis data in the tag unit 140.

The tag unit 140 includes a tag storage part 142 in which data is stored and a transmission/reception part 144 to perform data transmission with the mobile terminal 2 or the controller 110.

The tag unit 140 may be operated via simple contact (tagging) with the mobile terminal 2 based on near field communication, and may process data in a desired manner for data transmission/reception. Near field communication may ensure compatibility between various appliances and may allow data synchronization when all mobile terminals including a near field communication module meet data standard requirements. Such near field communication may generally be performed within a distance of below 10 cm. Due to the short communication distance, near field communication may have less risk of personal information leakage. The tag unit 140 may perform data reading or writing with respect to a tagged appliance when a near field communication function is activated.

Upon contact with the mobile terminal 2, the tag unit 140 may set a flag to indicate that the tag unit 140 is coming into contact with the mobile terminal 2. Even when new data is present, the tag unit 140 may set a corresponding flag to indicate a state of data.

The tag storage part 142 separately stores data received from and recorded by the mobile terminal 2 and washing machine data recorded by the controller 110. For example, the tag storage part 142 may store setting data that allows the mobile terminal 2 to change setting of the washing machine 1 and operation control data for operation control of the washing machine 1. In addition, the tag storage part 142 may store diagnosis data or diagnosis results to diagnose an operational state of the washing machine 1 based on combinations of data sensed during operation of the washing machine 1, and may further store data related to a current operational state of the washing machine 1.

In addition, the tag storage part 142 stores identification information and model information of the washing machine 1. In this case, the model information may include a manufacturer and a model name of the washing machine 1, information regarding whether the washing machine 1 has a communication function and the like.

The transmission/reception part 144 transmits data stored in the tag storage part 142 upon contact with the mobile terminal 2, or allows received data to be stored in the tag storage part 142. In this case, the transmission/reception part 144 communicates with the mobile terminal 2 via near field communication.

The tag unit 140 may be operated independently of the washing machine 1 even when the washing machine 1 is turned off to stop operation. In some cases, the tag unit 140 may be detachably attached to the washing machine 1.

In this case, when the mobile terminal 2 comes into contact with the tag unit 140 in an off state of the washing machine 1, the tag unit 140 may transmit stored data to the mobile terminal 2 and receive data from the mobile terminal 2, and may indicate the presence of new data as a flag.

When power is input and operation of the washing machine 1 begins, the controller 110 checks a state of the tag unit 140, receives data of the tag unit 140 recorded in an off state of the washing machine 1 and changes setting of the washing machine 1 or initiates operation of the washing machine 1 based on the received data.

The controller 110 controls the washing machine 1 based on data recorded in the tag unit 140 or stores specific data in the tag unit 140. In particular, when data stored in the tag unit 140 is network connection information, the controller 110 stores the network connection information in the memory 120 and applies the network connection information to the communication unit 170, thereby being connected to a designated access point (AP) and, in turn, connected to a network via the communication unit 170.

Figure 4:
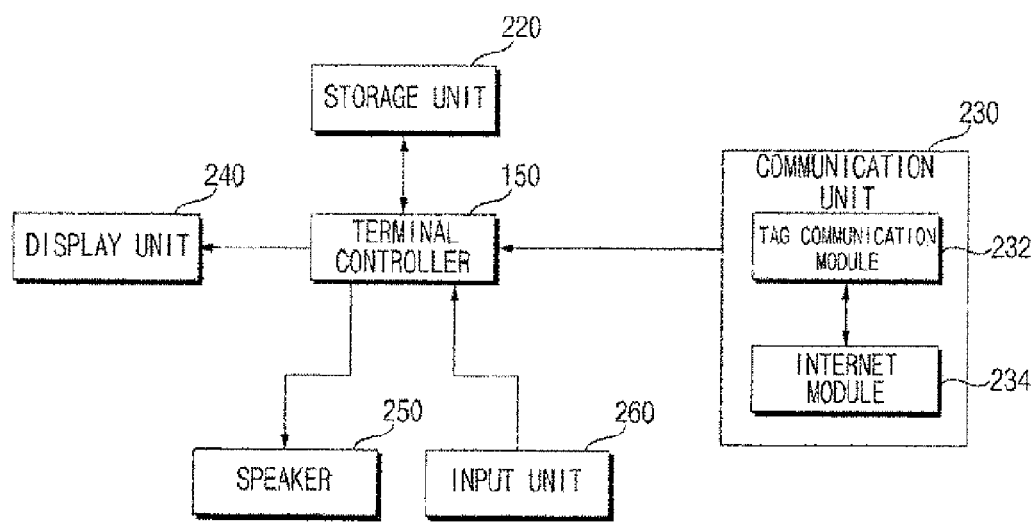
FIG. 4 is a block diagram showing a configuration of the mobile terminal according to an embodiment of the present invention.
Figure 5:
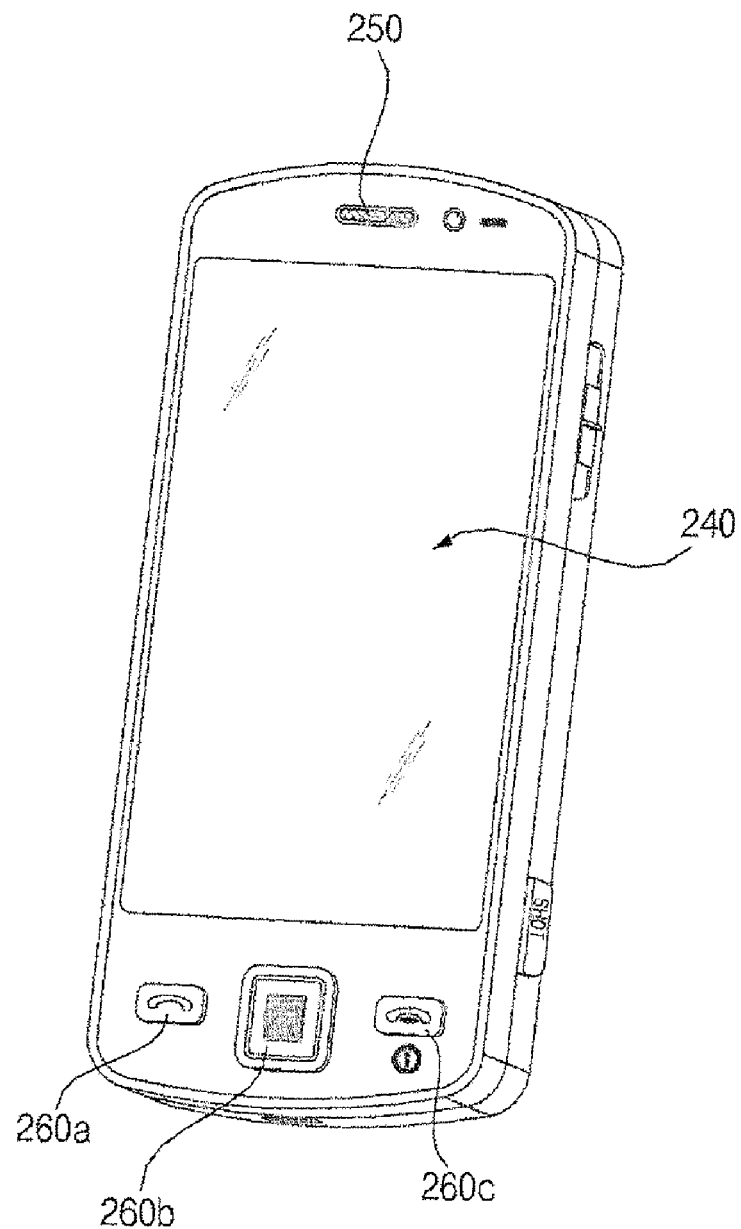
FIG. 5 is a perspective view of the mobile terminal according to an embodiment of the present invention.

FIG. 4 is a block diagram showing a configuration of the mobile terminal according to an embodiment of the present invention, and FIG. 5 is a perspective view of the mobile terminal according to an embodiment of the present invention.

Hereinafter, for convenience of description, among various types of portable mobile terminals, such as folding type, bar type, swing type and sliding type portable mobile terminals and the like, the mobile terminal 2 will be described by way of one example of a bar type portable mobile terminal having a front touchscreen. However, the present invention is not limited to the bar type portable mobile terminal and may be applied to all types of portable mobile terminals having an NFC function as well as the aforementioned types.

Referring to FIGS. 4 and 5, the mobile terminal 2 includes a communication unit 230, a storage unit 220, a display unit 240, an input unit 260, a speaker 250 and a terminal controller 210 to control general operations of the mobile terminal 2.

The storage unit 220 stores control data for operation control of the mobile terminal 2, operating data regarding an operational state of the mobile terminal 2, data regarding a plurality of applications to perform specific functions and user input data.

The display unit 240 displays data regarding an operational state of the mobile terminal 2 or data of the washing machine 1 received via the communication unit 230 on a screen in response to a control command of the terminal controller 210.

The display unit 240 serves to visually display information. For example, the display unit 240 may include at least one of a liquid crystal display, a thin film transistor liquid crystal display, an organic light emitting diode display, a flexible display and a 3-dimensional (3D) display. In this case, two or more display units 240 may be present based on the architecture of a mobile terminal. For example, a portable appliance may include an outer display unit (not shown) and an inner display unit (not shown) together.

In addition, the display unit 240 may include touch pads stacked in a multi-layered form. As such, the display unit 240 may be operated like a touchscreen and, in turn, function as the input unit 260 to enable information input by user touch action.

The input unit 260 may include at least one button or switch and a separate touch pad to enable conversation, mouse point movement or screen scroll, or to input start and end commands and the like.

The speaker 250 may take the form of a receiver or a speaker. In addition, a camera (not shown) may be configured into a form suitable for capture of user images or moving images. A microphone (not shown) may be configured into a form suitable for reception of user voice, other sound and the like.

The communication unit 230 includes a tag communication module 232 to perform data transmission/reception upon contact with the tag unit 140 of the washing machine 1 and an Internet module 234 to perform data transmission/reception with a prescribed server (not shown) via prescribed network connection. In addition, the communication unit 230 may include a mobile communication module (not shown) that is connected to a mobile communication network to perform data transmission/reception.

The terminal controller 210 controls the mobile terminal 2 to allow the mobile terminal 2 to perform specific operation by executing an application corresponding to data input via the input unit 260. The terminal controller 210 stores data input via the input unit 260 or the communication unit 230 in the storage unit 220, and outputs data via the display unit 240 or the speaker 250.

The terminal controller 210 displays data of the washing machine 1 received via the tag communication module 232 of the communication unit 230 on a screen of the display unit 240, and stores the data in the storage unit 220. In particular, the terminal controller 210 matches model information and identification information of the washing machine 1 to an ID and registers the matched information in the server 3 connected via the Internet module 234. The terminal controller 210 performs remote control and monitoring of the washing machine 1 using the matched ID based on a response of the server 3 when the washing machine 1 is normally registered.

In addition, the terminal controller 210 sets network connection information with respect to the washing machine 1 based on data input via the input unit 260, and records the network connection information in the tag unit 140 of the washing machine 1 when the tag communication module 232 comes into contact with the tag unit 140 of the washing machine 1.

In this case, the terminal controller 210 retrieves an accessible AP upon setting of wireless communication, and sets information regarding the selected AP and network connection information including a password of the selected AP and security setting to transmit the same to the washing machine 1.

In this way, the washing machine 1 stores the network connection information received via the tag unit 140 and accesses the selected AP to realize network connection.

In this case, the terminal controller 210 may display an error on the display unit 240 when the washing machine 1 does not have network connection capabilities or a pre-registered washing machine, or when information regarding the washing machine has errors.

Figure 6:
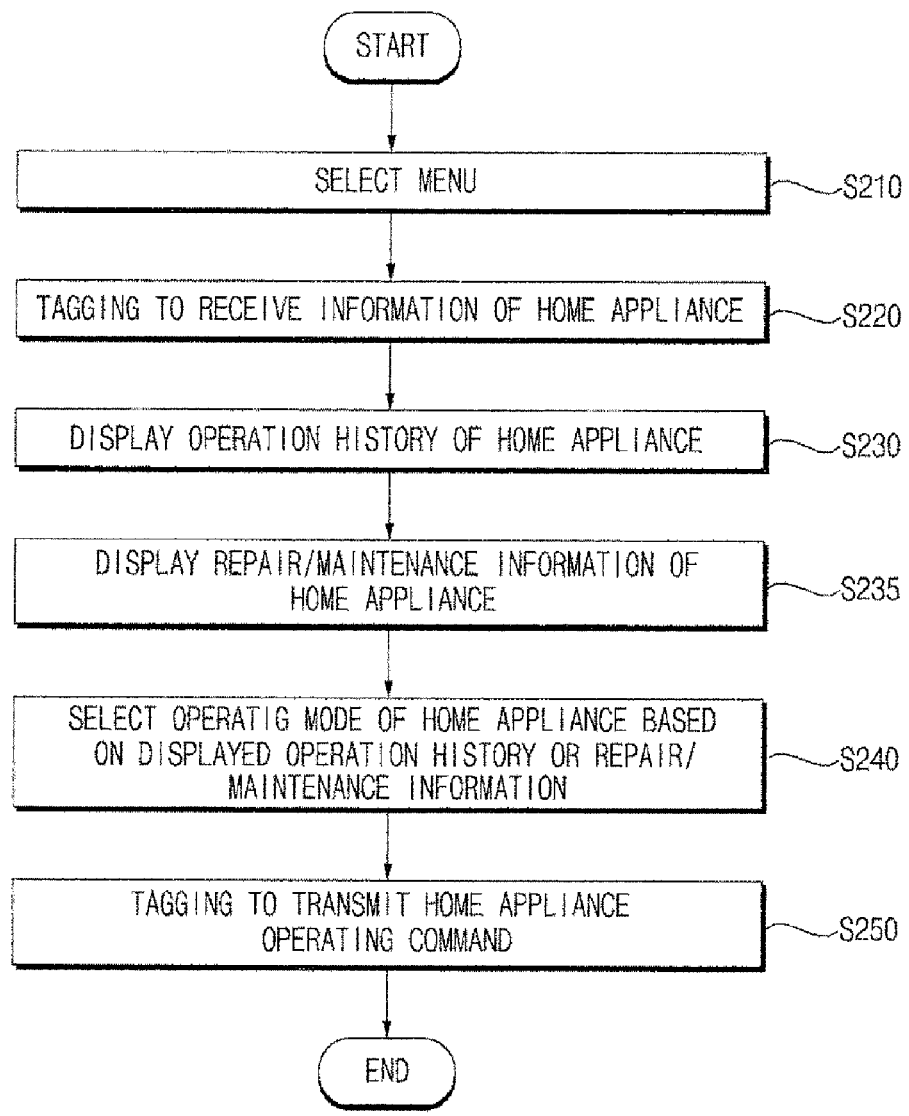
FIG. 6 is a flowchart showing a method of controlling the mobile terminal for operation control of a home appliance according to an embodiment of the present invention.

FIG. 6 is a flowchart showing a method of controlling the mobile terminal for operation control of a home appliance according to an embodiment of the present invention.

Referring to FIG. 6, the terminal controller 210 selects a menu upon receiving user input (S210). Here, the user input may be touch input to a region of the menu displayed on the display unit 240 of the mobile terminal 2.

Meanwhile, the menu may include several sub-menus to control, diagnose and guide a home appliance and the like. For example, a control menu is used to perform action to control operation of the home appliance. A diagnosis menu is used to perform diagnosis of a state of the home appliance. A guide menu is used to guide operation of the home appliance.

Once the menu is selected, the terminal controller 210 receives information of the home appliance via tagging with the tag unit 140 included in the home appliance based on near field communication (S220). In this case, tagging refers to an action of bringing the mobile terminal 2 into contact with the tag unit 140 included in the home appliance or bringing the mobile terminal 2 within a prescribed distance of the tag unit 140 based on near field communication.

For example, through tagging, the terminal controller 210 may receive a native ID of the home appliance a model information of the home appliance, an operation history of the home appliance, or repair/maintenance information of the home appliance. In this case, the home appliance may store the operation history of the home appliance or the repair/maintenance information of the home appliance in the tag unit 140 included in the home appliance. The terminal controller 210 receives the operation history of the home appliance or the repair/maintenance information of the home appliance via tagging with the tag unit 140 included in the home appliance based on near field communication.

Meanwhile, near field communication may ensure compatibility between various appliances and may allow data synchronization when all terminals including a near field communication module meet data standard requirements. Such near field communication may generally be performed within a distance of below 10 cm.

Once the information of the home appliance is received, the terminal controller 210 displays an operation history of the home appliance (S230). Here, the operation history of the home appliance includes what operating modes the home appliance performed for a predetermined period, how many times the home appliance performed operation, the number of operation times remaining until the time to perform repair/maintenance, and the last mode performed by the home appliance, for example.

Then, once the information of the home appliance is received, the terminal controller 210 displays repair/maintenance information of the home appliance (S235). Here, the repair/maintenance information of the home appliance includes how many times were repair/maintenance operation of the home appliance performed and a point in time when repair/maintenance of the home appliance will be performed, for example.

Although the present embodiment has described Step S235 as being performed after Step S230, Step S230 may be performed after Step S235 and Steps S230 and S235 may be simultaneously performed.

Once the operation history or repair/maintenance information of the home appliance is displayed, the terminal controller 210 receives user input and selects an operating mode or course of the home appliance based on the operation history or repair/maintenance information (S240).

For example, assuming that the home appliance is a washing machine, the last used course based on the operation history of the washing machine may be a speedy washing course. Here, the speedy washing course refers to a course that shortens a washing time in comparison with a normal course. The terminal controller 210 may select the speedy washing course that is the last used course displayed on the display unit 240 upon receiving user input.

Once the operating mode or course of the home appliance is selected, the terminal controller 210 transmits an operating command to control operation of the home appliance based on the selected operating mode via tagging with the tag unit 140 included in the home appliance (S250).

Figure 7:
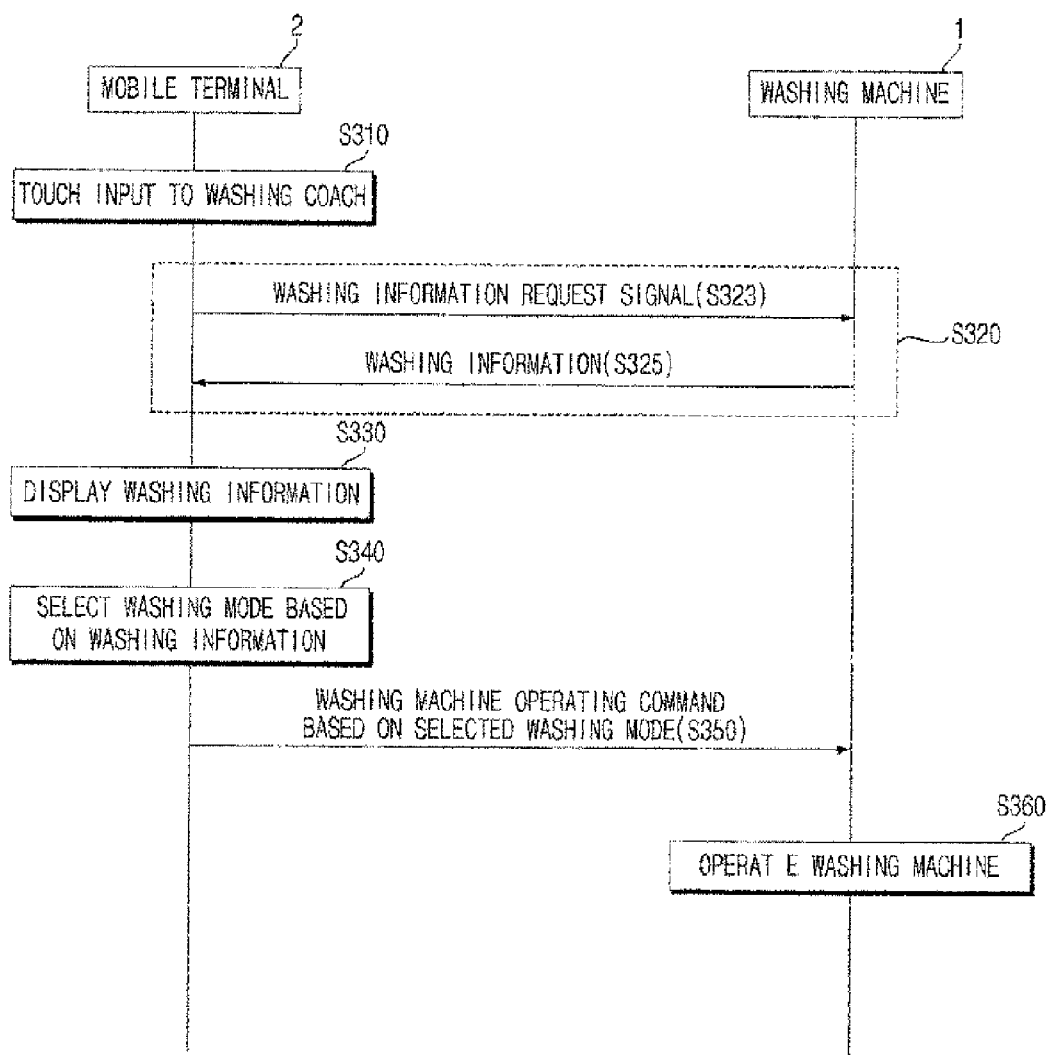
FIG. 7 is a view showing data flow between the mobile terminal and the washing machine according to an embodiment of the present invention.

FIG. 7 is a view showing data flow between the mobile terminal and the washing machine according to an embodiment of the present invention.

Referring to FIG. 7, the mobile terminal 2 selects a menu named "washing coach" (S310) upon receiving user input (S310). Step S310 corresponds to one embodiment of Step S210 of FIG. 6.

In this case, the user input may be touch action to the menu named "washing coach" among a plurality of menus displayed on the display unit 240 of the mobile terminal 2.

The menu named "washing coach" may be a menu to guide use of the washing machine 1. Upon selection of the menu named "washing coach", the mobile terminal 2 may provide selectable sub-menus named "washing diary", "detergent registration", "guidance on the amount of detergent" and "tub wash notification".

The sub-menu named "washing diary" provides an operation history of the washing machine 1. For example, the sub-menu named "washing diary" provides a used course history of the late ten times, a high frequency course, and the last used course.

The sub-menu named "detergent registration" provides a function of registering available detergent upon washing using the washing machine 1.

The sub-menu named "guidance on the amount of detergent" provides a function of notifying the amount of detergent to be input based on the amount of laundry sensed by the washing machine 1.

The sub-menu named "tub wash notification" provides information regarding the time to wash a tub, a tub wash method and a tub wash history.

Once the menu named "washing coach" is selected, the mobile terminal 2 is subjected to tagging with the tag unit 140 included in the washing machine 1 for reception of information of the washing machine 1 based on near field communication (S320). Step S320 corresponds to one embodiment of Step S220 of FIG. 6.

In this case, tagging refers to an action of bringing the mobile terminal 2 into contact with the tag unit 140 included in the washing machine 1 or bringing the mobile terminal 2 within a prescribed distance of the tag unit 140 based on near field communication.

Step S320 may include transmitting a washing information request signal to the washing machine 1 by the mobile terminal 2 (S323) and receiving washing information from the washing machine 1 at the mobile terminal 2 (S325).

Here, the washing information may include an operation history of the washing machine 1, repair/maintenance information of the washing machine 1, information regarding an appropriate input amount of detergent, pre-registered detergent information, a tub wash history, the time to wash a tub or the like.

Once the washing information is received, the mobile terminal 2 displays the washing information (S330). Step S330 corresponds to one embodiment of Step S230 of FIG. 6.

The displayed washing information may include a washing diary, a tub wash history of the washing machine 1 and the time to wash a tub, and detergent information.

For example, upon display of the washing diary, the mobile terminal 2 displays information regarding a used course history of the last ten times of the washing machine 1, a high frequency course, or the last used course.

Once the washing information is displayed, the mobile terminal 2 selects a washing mode based on the displayed washing information (S340). Step S340 corresponds to one embodiment of Step S240 of FIG. 6.

For example, once the washing diary including a used course history of the last ten times, a high frequency course, and the last used course is displayed, the mobile terminal 2 may select a speedy washing course that is the last used course upon receiving user input.

Once the washing mode is selected, the mobile terminal 2 is subjected to tagging with the tag unit 140 included in the washing machine 1 for transmission of an operating command to the washing machine 1 (S350). Step S350 corresponds to one embodiment of Step S250 of FIG. 6.

In this case, tagging refers to an action of bringing the mobile terminal 2 into contact with the tag unit 140 included in the washing machine 1 or bringing the mobile terminal 2 within a prescribed distance of the tag unit 140 based on near field communication.

Through tagging with the tag unit 140 included in the washing machine 1, the mobile terminal 2 transmits an operating command to the washing machine 1 to allow the washing machine 1 to be operated in the operating mode selected in Step S340.

Upon reception of the operating command based on the selected washing mode, the washing machine 1 is operated in response to the operating command (S360).

FIGS. 8 to 16 are views explaining a method of controlling the washing machine using the mobile terminal according to an embodiment of the present invention.

Figure 8:
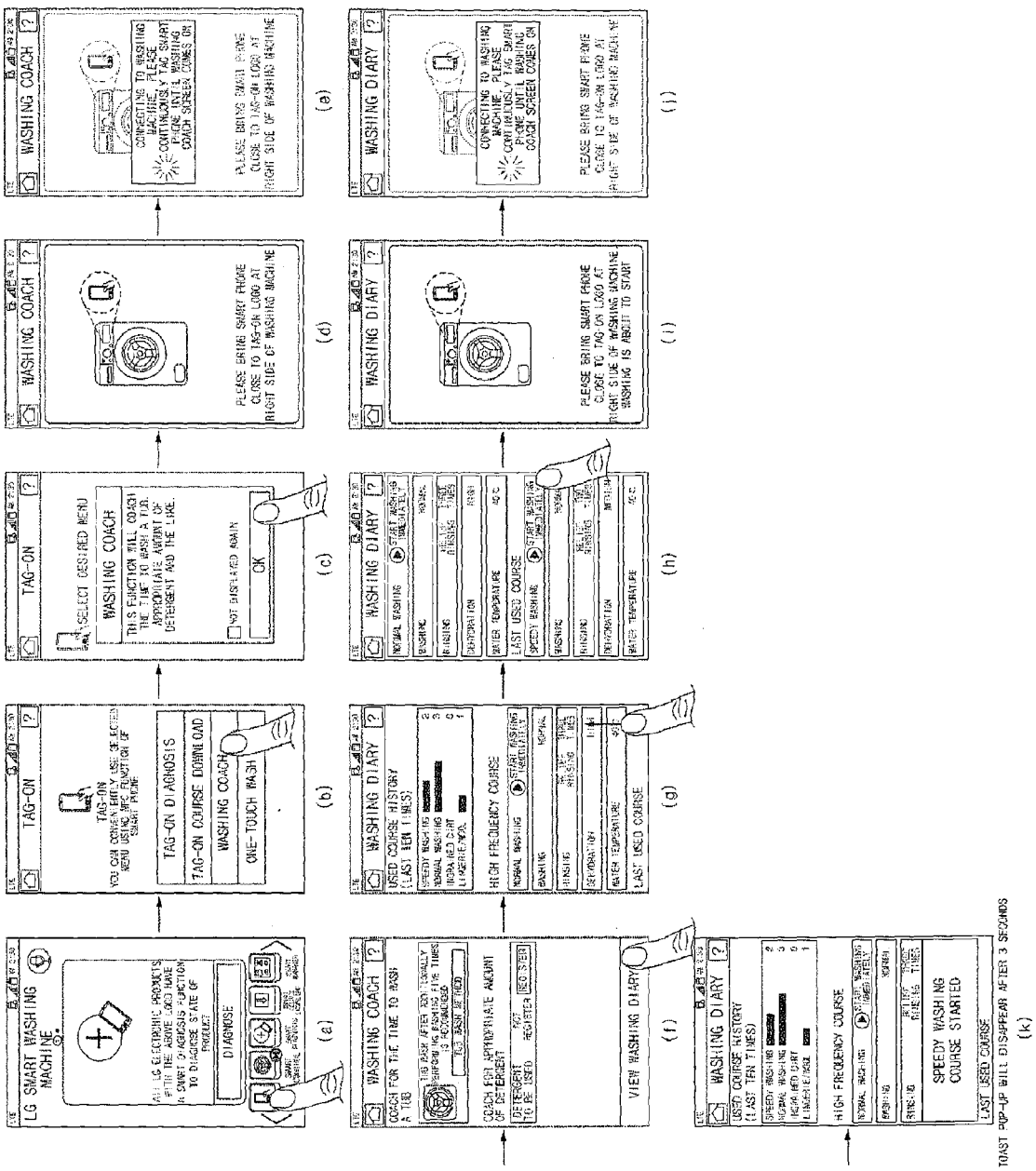

FIG. 8 shows examples of screens output on the display unit 240 when the mobile terminal 2 controls operation of the washing machine 1 based on a washing diary.

Referring to FIG. 8, the mobile terminal 2 executes an application that provides a control, diagnosis or use guide function for a home appliance. As exemplarily shown in FIG. 8(*a*), upon execution of the aforementioned application, the mobile terminal 2 displays prescribed menu icons to initiate washing machine control ("tag-on"), washing machine remote control ("smart remote control"), washing machine diagnosis ("smart diagnosis"), washing course download ("smart course download") and washing machine setting ("smart manager") via contact with the tag unit 140 of the washing machine 1.

Upon selection of the icon for washing machine control ("tag-on") via contact between the mobile terminal 2 and the tag unit 140 of the washing machine 1, as exemplarily shown in FIG. 8(*b*), the mobile terminal 2 displays menus named "tag-on diagnosis", "tag-on course download", "washing coach" and "one-touch washing". In addition, the mobile terminal 2 displays an explanation sentence of a tag-on function.

Upon selection of the menu named "washing coach", as exemplarily shown in FIG. 8(*c*), the mobile terminal 2 displays an explanation sentence of the menu named "washing coach" in a pop-up window.

Upon reception of touch input to "ok", as exemplarily shown in FIG. 8(*d*), the mobile terminal 2 displays a screen that gives an explanation of a method of tagging between the mobile terminal 2 and the tag unit 140 included in the washing machine 1.

During tagging between the mobile terminal 2 and the tag unit 140 included in the washing machine 1, as exemplarily shown in FIG. 8(*e*), the mobile terminal 2 displays a guide phrase and a mark, both of which indicate that the mobile terminal 2 is trying to connect to the washing machine 1. In this case, the mobile terminal 2 receives information of the washing machine 1 via tagging with the tag unit 140 included in the washing machine 1 based on near field communication. Here, the information of the washing machine 1 may include a native ID of the washing machine 1, an operation history of the washing machine 1 and repair/maintenance information of the washing machine 1.

After completion of tagging, as exemplarily shown in FIG. 8(*f*), the mobile terminal 2 displays a washing coach screen. In this case, the washing coach screen may include menus named "coach for the time to wash a tub", "coach for appropriate amount of detergent" and "view a washing diary". Here, the washing diary is one embodiment of an operation history of the home appliance as described above in connection with Step S230 or S240 of FIG. 6.

Upon reception of touch input to "view a washing diary", as exemplarily shown in FIGS. 8(*g*) and 8(*h*), the mobile terminal 2 displays content of the washing diary. The washing diary may include an operation history, such as a used course history of the last ten times, a high frequency course, the last used course and the like.

The used course history of the last ten times indicates a statistical chart of courses used in the washing machine 1 for the last ten times. For example, when a speedy washing course is used two times, a normal washing course is used three times, an ingrained-dirt removal course is used zero times and a lingerie/wool course is used one time, the mobile terminal 2 displays the number of times of the respective courses. In this case, the mobile terminal 2 may simultaneously display a graph to illustrate comparative numerical values related to the respective courses.

The high frequency course indicates a course frequently used for washing by the user of the washing machine. For example, when the high frequency course is a normal washing course, predetermined content related to washing, rinsing, dehydration or water temperature of the normal washing course is displayed.

The last used course indicates the last course used for washing by the user of the washing machine. For example, when the last used course is a speedy washing course, predetermined content related to washing, rinsing, dehydration or water temperature of the speedy washing course is displayed.

Meanwhile, when a washing diary display screen is too large to be displayed on the entire display unit 240 of the mobile terminal 2, the mobile terminal 2 may receive user flicking input to successively display the washing diary screen.

Upon reception of touch input to a sub-menu named "start washing immediately" of a menu named "the last used course" in a state in which the washing diary screen is displayed, as exemplarily shown in FIG. 8(i), the mobile terminal 2 displays a screen that gives an explanation of a method of tagging between the mobile terminal 2 and the tag unit 140 included in the washing machine 1.

During tagging between the mobile terminal 2 and the tag unit 140 included in the washing machine 1, as exemplarily shown in FIG. 8(j), the mobile terminal 2 displays a guide phrase and a mark, both of which indicate that the mobile terminal 2 is trying to connect to the washing machine 1. In this case, the mobile terminal 2 may transmit an operating command to control operation of the washing machine 1 based on a selected operation mode via tagging with the tag unit 140 included in the washing machine 1 based on near field communication.

After completion of tagging, as exemplarily shown in FIG. 8(k), the mobile terminal 2 displays a guide phase indicating that a speedy washing course has begun in a pop-up window. The mobile terminal 2 displays the pop-up window for a predetermined time (for example, 3 seconds).

Figure 9:
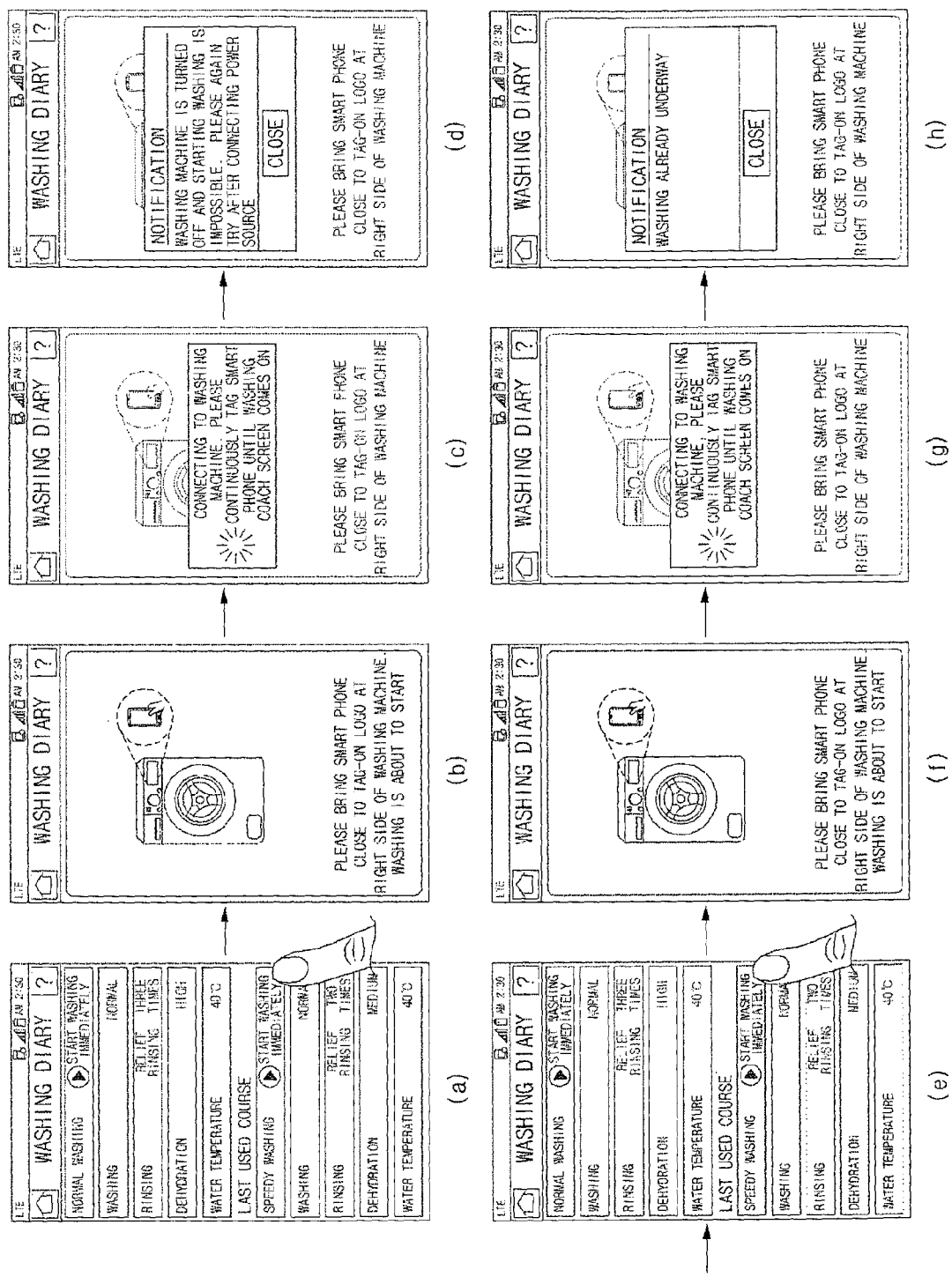

FIG. 9 shows examples of screens output on the display unit 240 when the mobile terminal 2 controls operation of the washing machine 1 based on a washing diary in an off state of the washing machine 1 or when the washing machine 1 has already been operated.

FIGS. 9(a) to 9(d) are exemplary views of screens output on the display unit 240 in an off state of the washing machine.

In an off state of the washing machine 1, as exemplarily shown in FIG. 9(a), the mobile terminal 2 receives touch input to a sub-menu named "start washing immediately" of a menu named "the last used course". Upon reception of the touch input, as exemplarily shown in FIG. 9(b), the mobile terminal 2 displays a screen that gives an explanation of a method of tagging between the mobile terminal 2 and the tag unit 140 included in the washing machine 1.

During tagging between the mobile terminal 2 and the tag unit 140 included in the washing machine 1, as exemplarily shown in FIG. 9(c), the mobile terminal 2 displays a guide phrase and a mark, both of which indicate that the mobile terminal 2 is trying to connect to the washing machine 1. In this case, the mobile terminal 2 receives information of the washing machine 1 via tagging with the tag unit 140 included in the washing machine 1 based on near field communication. In this case, the information of the washing machine 1 may be information related to an off state of the washing machine 1.

Upon checking that the power source of the washing machine is disconnected, as exemplarily shown in FIG. 9(d), the mobile terminal 2 displays a guide phase indicating that the washing machine is turned off and thus washing is impossible in a pop-un window. In this case, upon reception of touch input to "close", the mobile terminal 2 displays a washing diary screen.

FIGS. 9(e) to 9(h) are exemplary views of screens output on the display unit 240 during washing.

When the washing machine 1 has already been operated, as exemplarily shown in FIG. 9(e), the mobile terminal 2 receives touch input to the sub-menu named "start washing immediately" of the menu named "last used course". Upon reception of the touch input, as exemplarily shown in FIG. 9(f), the mobile terminal 2 displays a screen that gives an explanation of a method of tagging between the mobile terminal 2 and the tag unit 140 included in the washing machine 1.

During tagging between the mobile terminal 2 and the tag unit 140 included in the washing machine 1, as exemplarily shown in FIG. 9(g), the mobile terminal 2 displays a guide phrase and a mark, both of which indicate that the mobile terminal 2 is trying to connect to the washing machine 1. In this case, the mobile terminal 2 receives information of the washing machine 1 via tagging with the tag unit 140 included in the washing machine 1 based on near field communication. In this case, the information of the washing machine 1 may be information related to a current operating state of the washing machine 1.

Upon checking that tagging has completed and the washing machine 1 has already been operated, as exemplarily shown in FIG. 9(h), the mobile terminal 2 displays, in a pop-up window, a guide phase indicating that implementation of a selected washing course, i.e. a speedy washing course is impossible because the washing machine 1 has already been operated based on a previously selected course. In this case, upon reception of touch input to "close", the mobile terminal 2 displays a washing diary screen.

Figure 10:
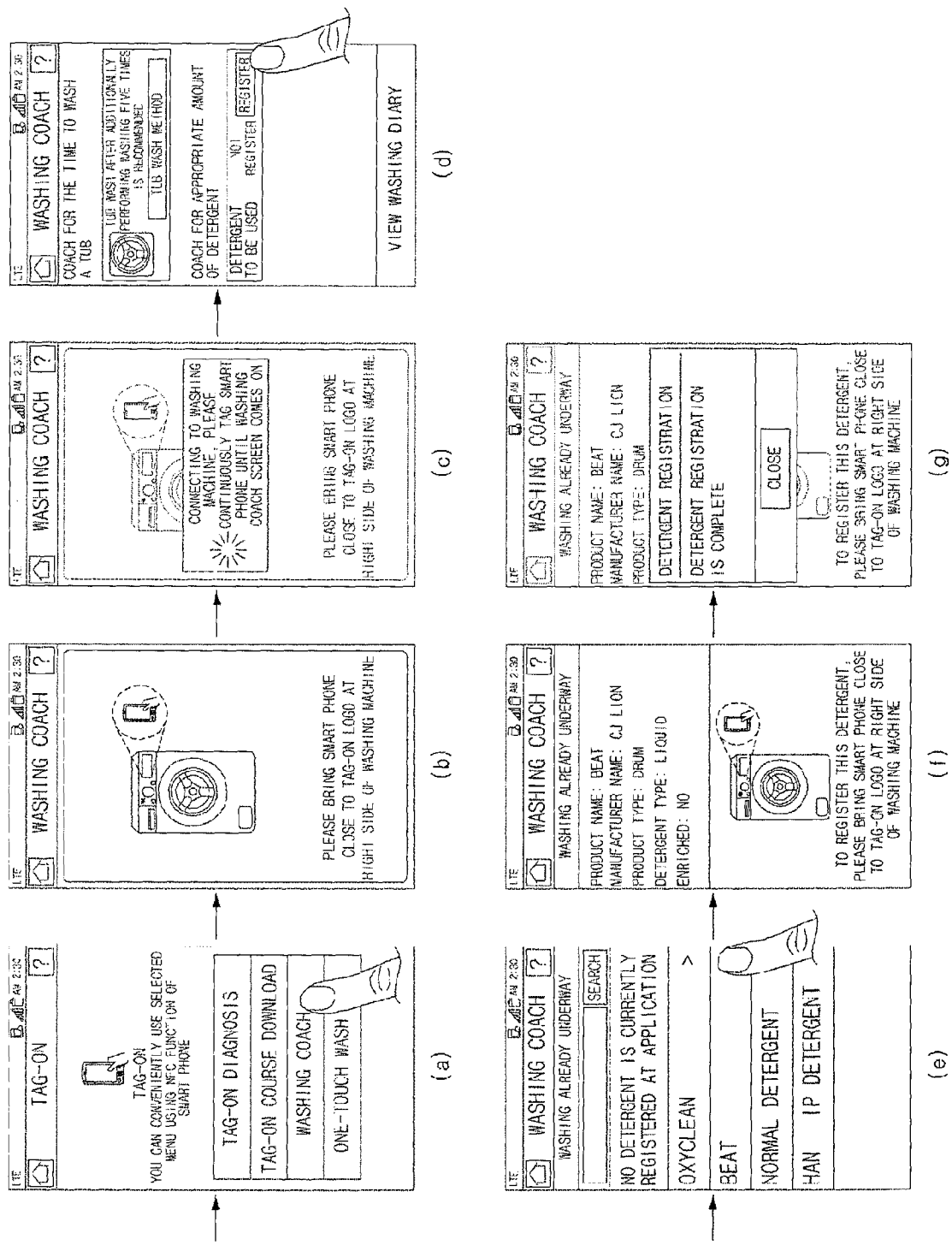

FIG. 10 shows examples of screens output on the display unit 240 when the mobile terminal 2 controls registration of detergent to be used.

As exemplarily shown in FIG. 10(a), the mobile terminal 2 may display menus named "tag-on diagnosis", "tag-on course download", "washing coach" and "one-touch washing".

Upon reception of touch input to the menu named "washing coach", as exemplarily shown in FIG. 10(b), the mobile terminal 2 displays a screen that gives an explanation of a method of tagging between the mobile terminal 2 and the tag unit 140 included in the washing machine 1.

During tagging between the mobile terminal 2 and the tag unit 140 included in the washing machine 1, as exemplarily shown in FIG. 10(c), the mobile terminal 2 displays a guide phrase and a mark, both of which indicate that the mobile terminal 2 is trying to connect to the washing machine 1. In this case, the mobile terminal 2 receives information of the washing machine 1 via tagging with the tag unit 140 included in the washing machine 1 based on near field communication. Here, the information of the washing machine 1 may include a native ID of the washing machine 1, an operation history of the washing machine 1 and repair/maintenance information of the washing machine 1.

After completion of tagging, as exemplarily shown in FIG. 10(d), the mobile terminal 2 displays a washing coach screen. In this case, the washing coach screen may include menus named "coach for tub wash notification", "coach for appropriate amount of detergent" and "view a washing diary".

Upon reception of touch input to a sub-menu named "register" related to a sub-menu named "detergent to be used" included in the menu named "coach for appropriate amount of detergent", as exemplarily shown in FIG. 10(e), the mobile terminal 2 displays a list of detergents. For example, the mobile terminal 2 may display several kinds of commercially available detergents including "Oxyclean™", "Beat™", "normal detergent", "han•ip Detergent™" and the like.

When "Beat™" is selected, as exemplarily shown in FIG. 10(f), the mobile terminal 2 displays information regarding detergent "Beat™". For example, the mobile terminal 2 displays a product name, a manufacturer, a product type, a detergent type or whether detergent is enriched. In addition, the mobile terminal 2 displays a screen that gives an explanation of a method of tagging between the mobile terminal 2 and the tag unit 140 included in the washing machine 1 for registration of the detergent "Beat™". The mobile terminal 2 may simultaneously display the tagging method and the information regarding the detergent "Beat™". In this case, the mobile terminal 2 may transmit an operating command to control operation of the washing machine 1 based on a selected operating mode via tagging with the tag unit 140 included in the washing machine 1 based on near field communication. Here, the operating command may be a command to register the detergent "Beat™".

After completion of tagging, as exemplarily shown in FIG. 10(g), the mobile terminal 2 displays a guide phrase indicating that registration of detergent is completed in a pop-up window. In this case, upon reception of touch input to "close", the mobile terminal 2 switches to a washing coach screen.

Figure 11:
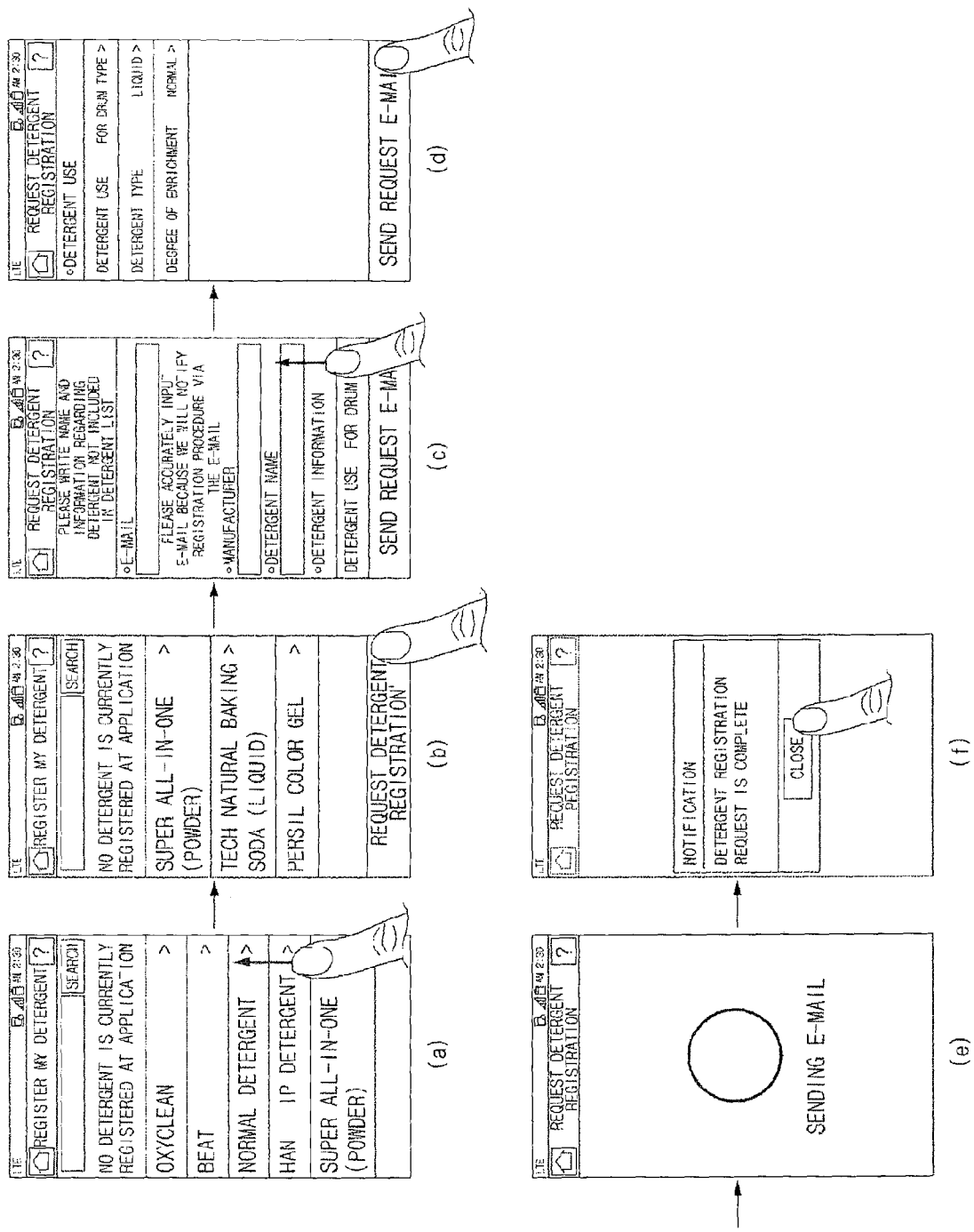

FIG. 11 shows examples of screens output on the display unit 240 when the mobile terminal 2 controls request for registration of detergent to be used.

As exemplarily shown in FIGS. 11(a) and 11(b), the mobile terminal 2 displays a list of detergents. For example, the mobile terminal 2 displays "Oxyclean™", "Beat™", "normal detergent", "han•ip Detergent™" and the like. When a great number of detergents are present, the mobile terminal 2 may successively display the detergents upon receiving flicking input.

When the list contains no detergent that the user wishes to register, the mobile terminal 2 cannot perform request for detergent registration. Upon reception of touch input to a menu named "request for detergent registration", "as exemplarily shown in FIGS. 11(c) and 11(d), the mobile terminal 2 displays a detergent registration request screen". The detergent registration request screen may include a requester's e-mail address input part, a manufacturer input part, a detergent name input part and a detergent information selection part. In response to a user command, the mobile terminal 2 receives touch input to menus named "e-mail address", "detergent name", "manufacturer" and "detergent information" and, thereafter, receives touch input to a menu named "send a request e-mail". In this case, the mobile terminal 2 may transmit a detergent registration request e-mail to an application providing server or a manufacturer's server of the washing machine 1 via the communication unit 230. Here, the application may be an application that enables data transmission/reception with the washing machine 1 and control of the washing machine 1.

Upon reception of touch input to the menu named "send a request e-mail", as exemplarily shown in FIG. 11(e), the mobile terminal 2 displays a message "Sending an e-mail".

After completion of transmission of the e-mail, the mobile terminal 2 displays a message "Request for detergent registration has completed". In this case, upon reception of touch input to "close", the mobile terminal 2 switches to a washing coach screen.

Figure 12:
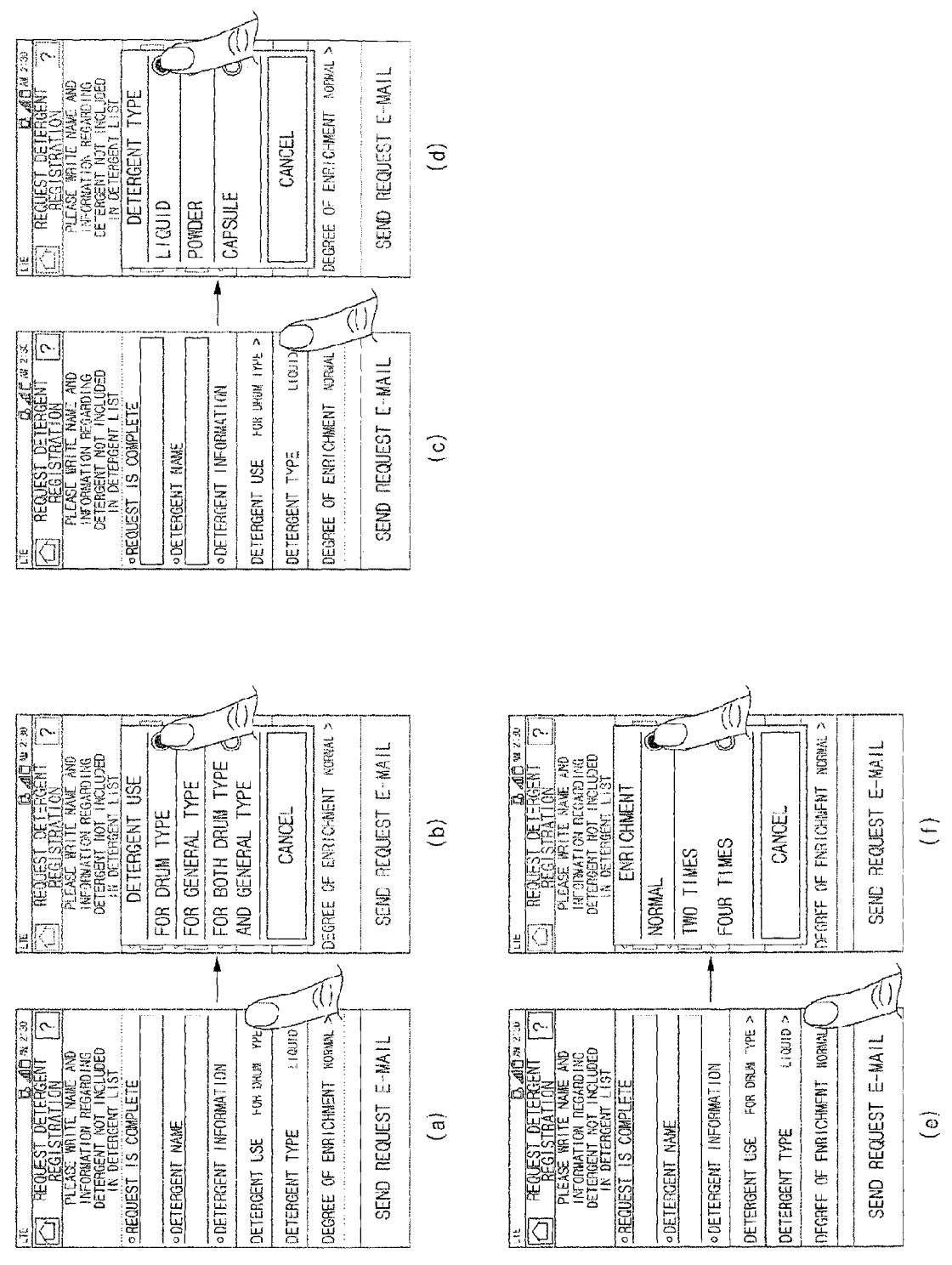

FIG. 12 shows examples of screens output on the display unit 240 when the mobile terminal 2 sets detergent information options during request for detergent registration.

As exemplarily shown in FIG. 12(a), the mobile terminal 2 displays a detergent registration request screen. The detergent registration request screen may include a requester's e-mail address input part, a manufacturer input part, a detergent name input part, and a detergent information selection part. Upon reception of touch input to a sub-menu named "detergent uses" of a menu named "detergent information", as exemplarily shown in FIG. 12(b), the mobile terminal 2 displays a list of detergent uses. For example, the list of detergent uses may include "for drum type", "for general type" and "for both drum type and general type". The mobile terminal 2 may select "for drum type" in the displayed list upon receiving user input. Upon reception of touch input to "cancel", the mobile terminal 2 displays a detergent registration request screen.

As exemplarily shown in FIG. 12(c), the mobile terminal 2 displays a detergent registration request screen. Upon reception of touch input to a sub-menu named "detergent kind" of the menu named "detergent information", as exemplarily shown in FIG. 12(d), the mobile terminal 2 displays a list of detergent kinds. For example, the list of detergent kinds may include "liquid", "powder" and "capsule". The mobile terminal 2 may select "liquid" from the displayed list upon receiving user input. Upon reception of touch input to "cancel", the mobile terminal 2 displays a detergent registration request screen.

As exemplarily shown in FIG. 12(e), the mobile terminal 2 displays a detergent registration request screen. Upon reception of touch input to a sub-menu named "degree of enrichment" of the menu named "detergent information", as exemplarily shown in FIG. 12(f), the mobile terminal 2 displays a list of degrees of enrichment. For example, the list of degrees of enrichment may include "normal" "two times" and "four times". The mobile terminal 2 may select "normal" from the displayed list upon receiving user input. Upon reception of touch input to "cancel", the mobile terminal 2 displays a detergent registration request screen.

Figure 13:
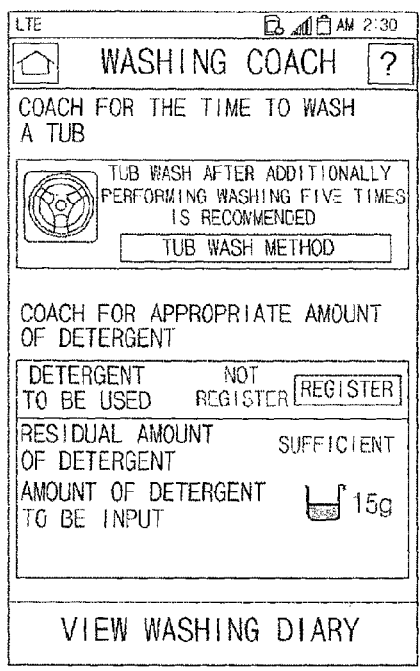
Figure 13:
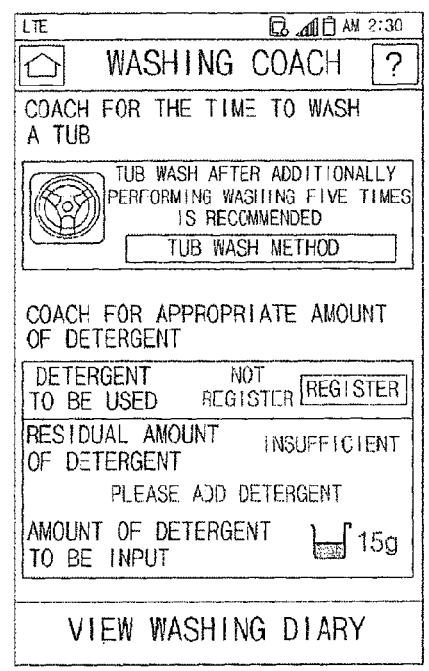

FIG. 13 shows examples of screens output on the display unit 240 when the mobile terminal 2 guides the amount of detergent for use in an automated detergent input type washing machine.

As exemplarily shown in FIG. 13(a), when a sufficient amount of detergent for washing is received in the washing machine 1, the mobile terminal 2 may display phrases "residual amount of detergent—sufficient" and "amount of detergent to be input—15 g" with regard to a menu named "coach for appropriate amount of detergent". Here, the automated detergent input type washing machine may function to sense a residual amount of detergent and to judge the amount of detergent to be input via comparison between the sensed residual amount of detergent and the amount of laundry. In this case, the mobile terminal 2 receives information of the washing machine 1 via tagging with the tag unit 140 included in the washing machine 1 based on near field communication. Here, the information of the washing machine 1 may be information regarding the amount of detergent to be input.

As exemplarily shown in FIG. 13(*b*), when the amount of detergent received in the washing machine 1 is insufficient for washing, the mobile terminal 2 may display phrases "residual amount of detergent—insufficient", "please add detergent" and "amount of detergent to be input—15 g" with regard to the menu named "coach for appropriate amount of detergent". Here, the automated detergent input type washing machine may function to sense a residual amount of detergent and to judge the amount of detergent to be input via comparison between the sensed residual amount of detergent and the amount of laundry.

Figure 14:
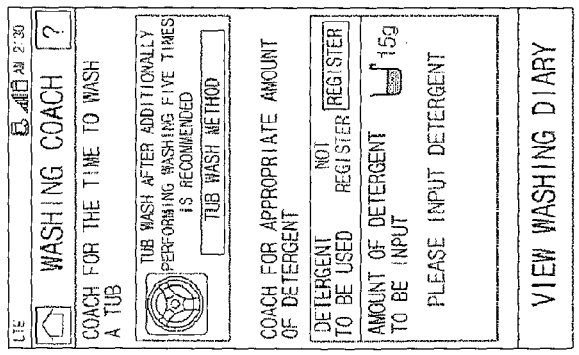
Figure 14:
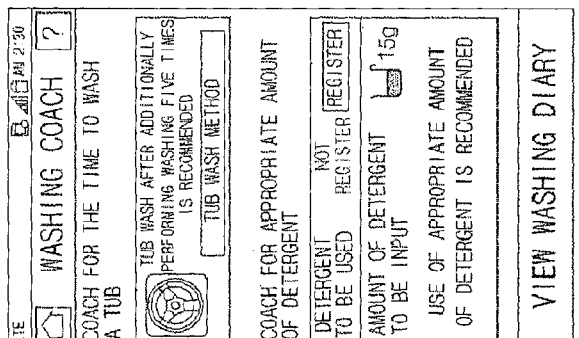
Figure 14:
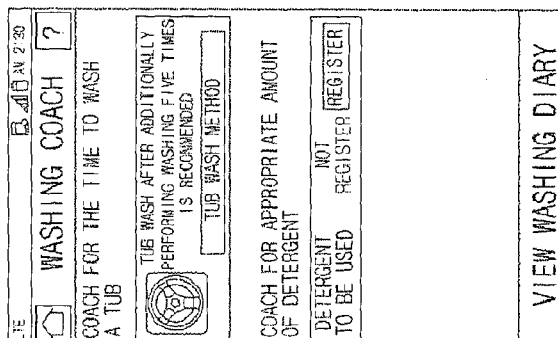
Figure 14:
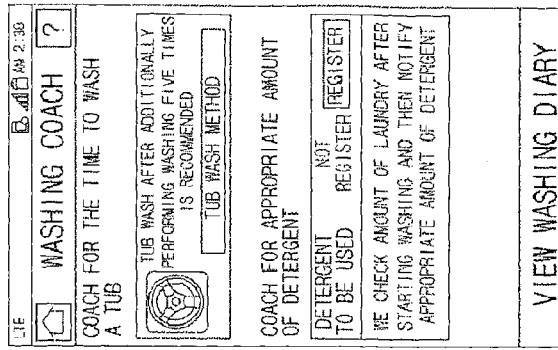

FIG. 14 shows examples of screens output on the display unit 240 when the mobile terminal 2 guides the amount of detergent for use in a washing machine having no automated detergent input device.

As exemplarily shown in FIG. 14(*a*), when the washing machine 1 senses the amount of laundry and the mobile terminal 2 receives information regarding the amount of laundry via tagging with the tag unit 140 included in the washing machine 1 based on near field communication, the mobile terminal 2 displays phrases "required amount of detergent—15 g" and "please input detergent".

As exemplarily shown in FIG. 14(*b*), during operation of the washing machine after input of detergent, the mobile terminal 2 displays phrases "required amount of detergent—15 g" and "use of appropriate amount of detergent is recommended".

As exemplarily shown in FIG. 14(*c*), in an off state of the washing machine 1, the mobile terminal 2 does not display content related to the required amount of detergent.

As exemplarily shown in FIG. 14(*d*), when the washing machine 1 does not sense the amount of laundry, the mobile terminal 2 displays a message "We will check the amount of clothing (the amount of laundry) after starting washing and notify an appropriate amount of detergent". In this case, the washing machine 1 functions to sense the amount of laundry and to calculate the amount of detergent corresponding to the amount of laundry. After the washing machine 1 senses the amount of laundry and calculates the amount of detergent, the mobile terminal 2 performs tagging with the tag unit 140 included in the washing machine 1. Through tagging, the mobile terminal 2 receives information regarding the sensed amount of laundry and the calculated amount of detergent. The mobile terminal 2 displays the amount of detergent corresponding to the sensed amount of laundry.

Figure 15:
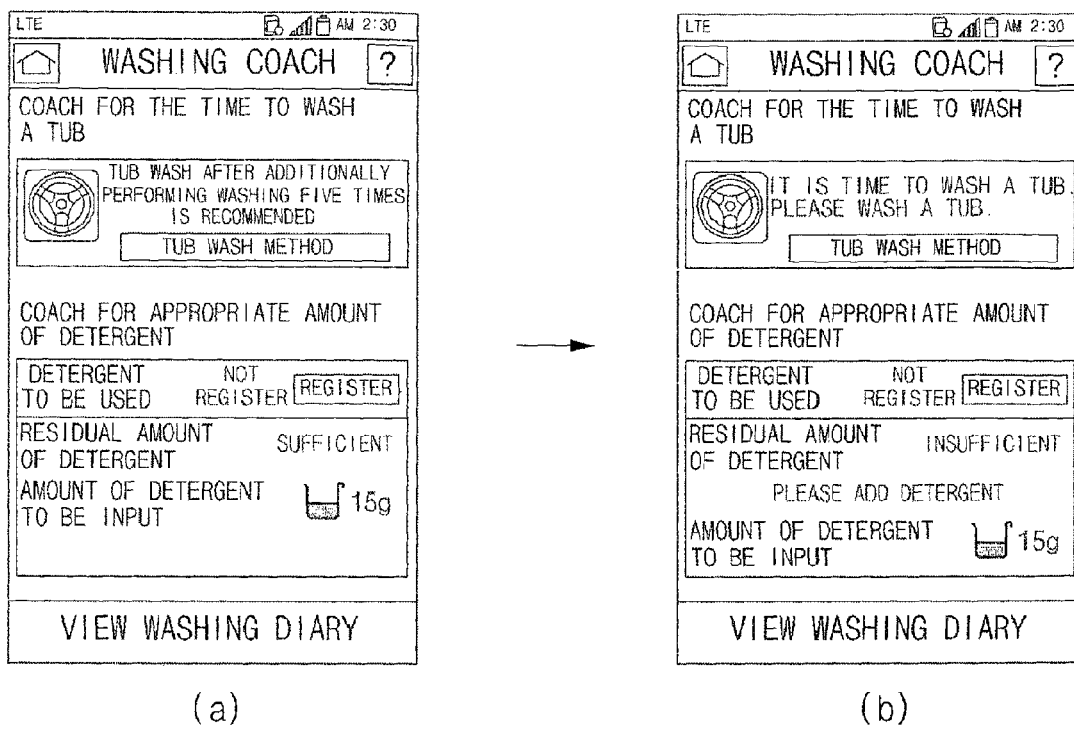

FIG. 15 shows examples of screens output on the display unit 240 when the mobile terminal 2 displays a tub wash notification. Here, tub wash is one embodiment of repair/maintenance of the home appliance as described in connection with Step S235 or S240 of FIG. 6. The mobile terminal 2 receives information of the washing machine 1 via tagging with the tag unit 140 included in the washing machine 1 based on near field communication. In this case, information of the washing machine 1 may be information regarding tub wash.

As exemplarily shown in FIG. 15(*a*), when it is not the time to wash a tub, the mobile terminal 2 displays a message "tub wash after additionally performing washing five times is recommended". In this case, a recommended number of washing times until the time to perform tub wash may be a predetermined number of times. Although the present embodiment exemplifies five times, a recommended number of washing times until the time to perform tub wash may be arbitrarily set by a washing machine manufacturer or a user.

As exemplarily shown in FIG. 15(*b*), when it is the time to wash a tub, the mobile terminal 2 displays a message "It is the time to wash a tub. Please perform tub wash". Upon reception of touch input to "tub wash method", the mobile terminal 2 may display a tub wash method.

Figure 16:
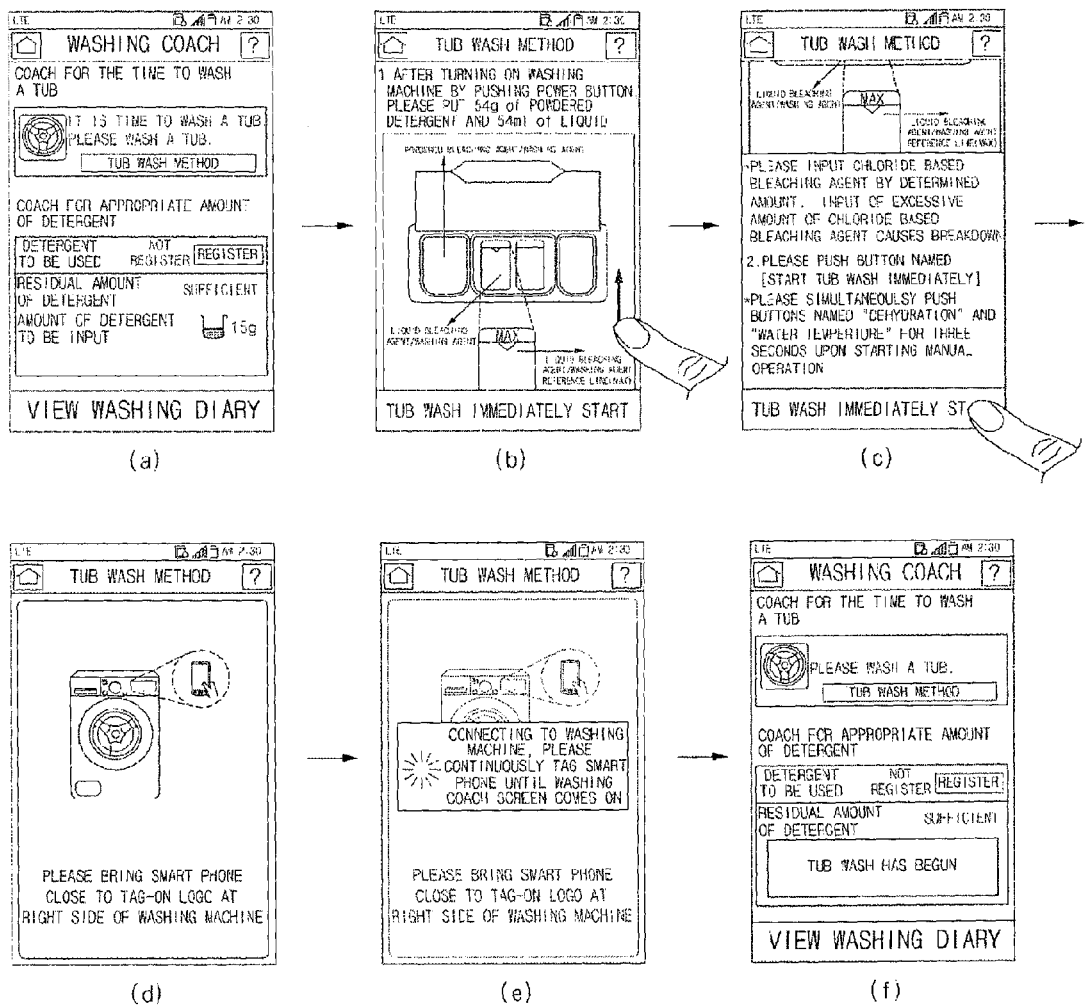

FIG. 16 shows examples of screens output on the display unit 240 when the mobile terminal 2 displays a tub wash method.

As exemplarily shown in FIG. 16(*a*), the mobile terminal 2 receives touch input to "tub wash method" in a state in which a washing coach screen is displayed.

Upon reception of touch input to "tub wash method", as exemplarily shown in FIGS. 16(*b*) and 16(*c*), the mobile terminal 2 displays explanation content of a tub wash method. In this case, when the explanation content is too large to be displayed on a single screen, the mobile terminal 2 may successively display the explanation content upon receiving flicking input. The mobile terminal 2 receives touch input to a menu named "start tub wash immediately".

Upon reception of touch input to the menu named "start tub wash immediately", as exemplarily shown in FIG. 16(*d*), the mobile terminal 2 displays a screen that gives an explanation of a method of tagging between the mobile terminal 2 and the tag unit 140 included in the washing machine 1.

During tagging between the mobile terminal 2 and the tag unit 140 included in the washing machine 1, as exemplarily shown in FIG. 16(*e*), the mobile terminal 2 displays a guide phrase and a mark, both of which indicate that the mobile terminal 2 is trying to connect to the washing machine 1. In this case, the mobile terminal 2 may transmit an operating command to control operation of the washing machine 1 based on a selected operating mode via tagging with the tag unit 140 included in the washing machine 1 based on near field communication. Here, the operating command may be a control command for tub wash.

After completion of tagging, as exemplarily shown in FIG. 16(*f*), the mobile terminal 2 displays a washing coach screen. The mobile terminal 2 displays a message indicating that tub wash has begun in a displayed state of the washing coach screen. In addition, the mobile terminal 2 displays the number of operation times remaining until the time to perform repair/maintenance, i.e. the number of operation times remaining until the time to perform tub wash.

Figure 17:
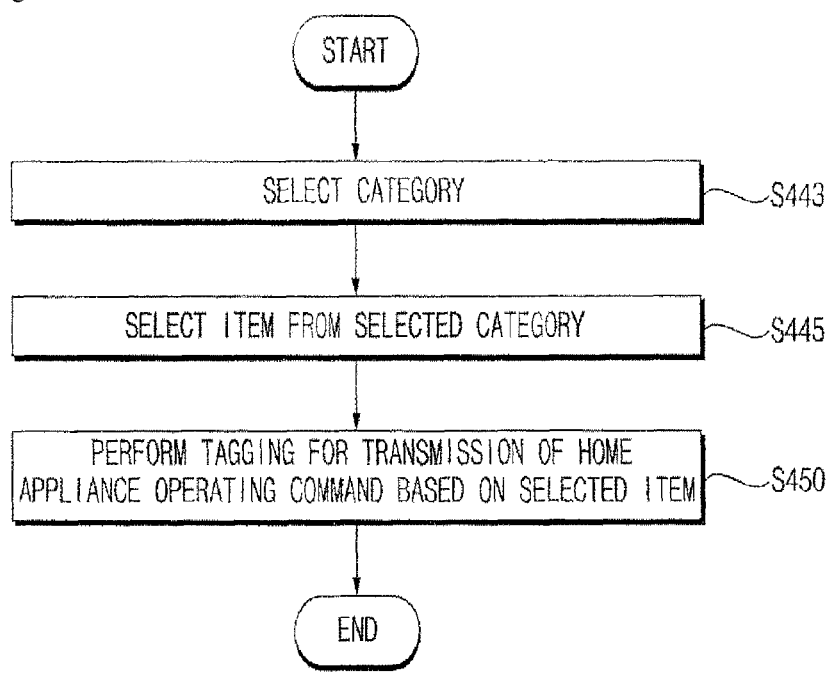
FIG. 17 is a flowchart showing a method of controlling the mobile terminal for operation control of the washing machine according to an embodiment of the present invention.

FIG. 17 is a flowchart showing a method of controlling the mobile terminal for operation control of the washing machine according to an embodiment of the present invention.

Referring to FIG. 17, the mobile terminal 2 receives user input and selects a category (S443). The mobile terminal 2 selects an item from the selected category (S445). Step S443 and Step S445 are one embodiment of Step S240 of FIG. 6.

Here, the mobile terminal 2 provides several categories per functions and purposes that the user wishes. In addition, the mobile terminal 2 provides each category with items optimized to accomplish the function and purpose of the corresponding category selected based on a state of laundry.

For example, the mobile terminal provides washing courses based on the model information.

For example, there are provided operating categories of the washing machine, such as "sanitation and deodorization course", "clothing care course", "time-saving course", "course per time and weather" and "spot and stain removal course".

Meanwhile, items of the category named "sanitation and deodorization course" may include "bedding deodorization and sanitation", "blanket dusting", "clothing deodorization without washing" and "allergen removal".

In addition, items of the category named "clothing care course" may include "wrinkle free washing", "lint free washing" and "clean washing with careful rinsing".

In addition, items of the category named "time-saving course" may include "washing of a little laundry", "washing with minimum power" and "washing with minimum time".

In addition, items of the category named "course per time and weather" may include "complete drying of laundry in the rainy season".

In addition, items of the category named "spot and stain removal course" may include "washing of dress shirt (collar and cuff)" and "washing for sweat stain removal).

TABLE 1

[One-Touch Washing Course]

| Category | Item | | Explanation |
|---|---|---|---|
| Sanitation and deodorization course | Bedding deodorization and sanitation | Steam cleaning | Remove odor and bacteria from bedding with hot air while continuously rotating a wash tub |
| | Blanket Dusting | Blanket sanitation dusting | Perform dusting of blanket with hot air while continuously rotating a wash tub |
| | Clothing deodorization without washing | Steam cleaning | Remove odor from clothing with steam |
| | Allergen removal | Allergy care | Sanitize an allergen with steam |
| Clothing care course | Wrinkle free washing | Normal course + anti-wrinkle option | Reduce wrinkles of clothing after washing by reducing dehydration intensity |
| | Lint free washing | Functional clothing | Reduce lint using a prescribed motion suitable for prevention of laundry entanglement |
| | Clean washing with careful rinsing | Normal course + rinsing two times | Increase rinsing force by adding rinsing to a normal course |
| Time-saving course | High-speed rotation of a little laundry | Speedy washing | Use prescribed course to reduce washing time as compared to a normal course |
| | Washing with minimum power | Cold water washing | Maintain washing force using a strong motion while reducing power via cold water washing |
| | Washing with minimum time | Speedy washing | Use prescribed course to reduce washing time as compared to a normal course |
| Course per time and weather | Complete drying in the rainy season | Normal course + strong drying | Minimize moisture of laundry by increasing dehydration intensity |

TABLE 1-continued

[One-Touch Washing Course]

| Category | Item | | Explanation |
|---|---|---|---|
| Spot and stain removal course | Washing of dress shirt (collar and cuff) | Ingrained dirt removal (soaking) course | Reduce ingrained dirt by soaking laundry stepwise in cold water and hot water |
| | Washing for sweat stain removal | Ingrained dirt removal course | Reduce ingrained dirt by soaking laundry stepwise in cold water and hot water |

Explaining the aforementioned respective items in detail, the item named "bedding deodorization and sanitation" uses a steam cleaning function provided by the washing machine. The item named "bedding deodorization and sanitation" provides operation to remove odor and bacteria from bedding with hot air while continuously rotating a wash tub.

In addition, the item named "blanket dusting" uses a blanket sanitation dusting function provided by the washing machine. The item named "blanket dusting" provides operation to perform dusting of a blanket with hot air while continuously rotating a wash tub.

In addition, the item named "clothing deodorization without washing" uses a steam cleaning function provided by the washing machine. The item "clothing deodorization without washing" provides operation to remove odor from clothing with steam.

In addition, the item named "allergen removal" uses an allergy care function provided by the washing machine. The item named "allergen removal" provides operation to remove an allergen with steam.

In addition, the item named "wrinkle free washing" uses addition of an anti-wrinkle option to a normal course function provided by the washing machine. The item named "wrinkle free washing" provides operation to reduce wrinkles of clothing after washing by reducing dehydration intensity.

In addition, the item named "lint free washing" uses a functional clothing function provided by the washing machine. The item named "lint free washing" provides operation to reduce lint using a prescribed motion suitable to prevent clothing (laundry) entanglement.

In addition, the item named "clean washing with careful rinsing" uses addition of rinsing to a normal course function provided by the washing machine. The item named "clean washing with careful rinsing" provides operation to increase rinsing force by adding rinsing to a normal course.

In addition, the item named "high speed rotation of a little laundry" uses a speedy washing function provided by the washing machine. The item named "high speed rotation of a little laundry" provides operation using a prescribed course to reduce washing time as compared to a normal course.

In addition, the item named "washing with minimum power" uses a cold water washing function provided by the washing machine. A prescribed amount of power is consumed to heat water. The item named "washing with minimum power" directly uses cold water without power consumption required to heat water. The item named "washing with minimum power" applies strong physical force to laundry by increasing drive power of a motor in proportion to reduced power consumption. Even in the case of cold water washing, effective washing may be accomplished with strong physical force applied to the laundry.

In addition, the item named "washing with minimum time" uses a speedy washing function provided by the washing machine. The item named "washing with minimum time" provides operation using a prescribed course to reduce washing time as compared to a normal course.

In addition, the item named "complete drying in the rainy season" uses addition of a strong drying function to a normal course function provided by the washing machine. The item named "complete drying in the rainy season" provides operation to minimize moisture of laundry by increasing dehydration intensity.

In addition, the item named "washing of dress shirt (collar and cuff)" uses an ingrained dirt removal (soaking) course provided by the washing machine. The item named "washing of dress shirt (collar and cuff)" provides operation to reduce ingrained dirt by soaking clothing (laundry) stepwise in cold water and hot water. For example, the washing machine 1 may first perform soaking of laundry using hot water and then, e.g., rinsing the laundry in cold water.

In addition, the item named "washing for sweat stain removal" uses an ingrained dirt removal course provided by the washing machine. The item named "washing for sweat stain removal" provides operation to reduce ingrained dirt by soaking clothing (laundry) stepwise in cold water and hot water. For example, the washing machine 1 may first perform soaking of laundry using hot water and then perform, e.g., rinsing the laundry in cold water.

After completion of item selection, the mobile terminal 2 performs tagging with the tag unit 140 included in the washing machine 1 in order to transmit a home appliance operating command based on the selected item (S450). Step S450 is one embodiment of Step S250 of FIG. 6.

Here, tagging refers to an action of bringing the mobile terminal 2 into contact with the tag unit 140 included in the home appliance or bringing the mobile terminal 2 within a prescribed distance of the tag unit 140 based on near field communication.

Through tagging with the tag unit 140 included in the washing machine 1, the mobile terminal 2 transmits an operating command to the washing machine 1 to allow the washing machine 1 to be operated based on the category and the item selected in Step S443 and Step S445.

To allow the washing machine 1 to be operated in an optimum washing course based on the category and the item selected in Step S443 and Step S445, the mobile terminal 2 transmits an operating command signal to the washing machine 1.

The mobile terminal 2 produces an operating command to allow the washing machine 1 to be operated in an operating pattern corresponding to the selected item.

In some embodiments, the operating pattern may be a washing course to be selected by the user via a control panel of the washing machine 1. In this case, the operating command is a command to control the washing machine 1 such that the washing machine 1 performs a washing course corresponding to an item selected by the mobile terminal 2 among the aforementioned washing courses.

For example, the mobile terminal 2 selects the item named "clean washing with careful rinsing". The mobile terminal 2 transmits an operating command signal to the washing machine 1 via tagging with the tag unit 140 included in the washing machine 1 based on near field communication, and the washing machine 1 receives the operating command signal. Upon reception of an operating command corresponding to the item named "clean washing with careful rinsing", the washing machine 1 is operated to perform rinsing two times in addition to a normal course based on the item named "clean washing with careful rinsing". In this case, the user may advantageously select an optimum washing course based on a state of laundry even without knowing an operating manual of the washing machine 1.

Differently, the operating command may be a command to change an operating pattern previously provided by the washing machine to thereby produce a new operating pattern and, in turn, control the washing machine based on the new operating pattern. Operation of the washing machine may be controlled to be more suitable for treatment of laundry based on the selected item.

The mobile terminal 2 selects the item named "clean washing with careful rinsing". The mobile terminal 2 transmits an operating command signal to the washing machine 1 via tagging with the tag unit 140 included in the washing machine 1 based on near field communication, and the washing machine 1 receives the operating command signal. Upon reception of an operating command corresponding to the item named "clean washing with careful rinsing", the washing machine 1 judges whether there is a predetermined operating pattern corresponding to the item named "clean washing with careful rinsing". When there is no predetermined operating pattern, the washing machine 1 changes an operating pattern based on an operating command of the mobile terminal 2 to produce an operating pattern for implementation of rinsing two times in addition to a normal course and, in turn, be operated based on the produced operating pattern.

Figure 18:
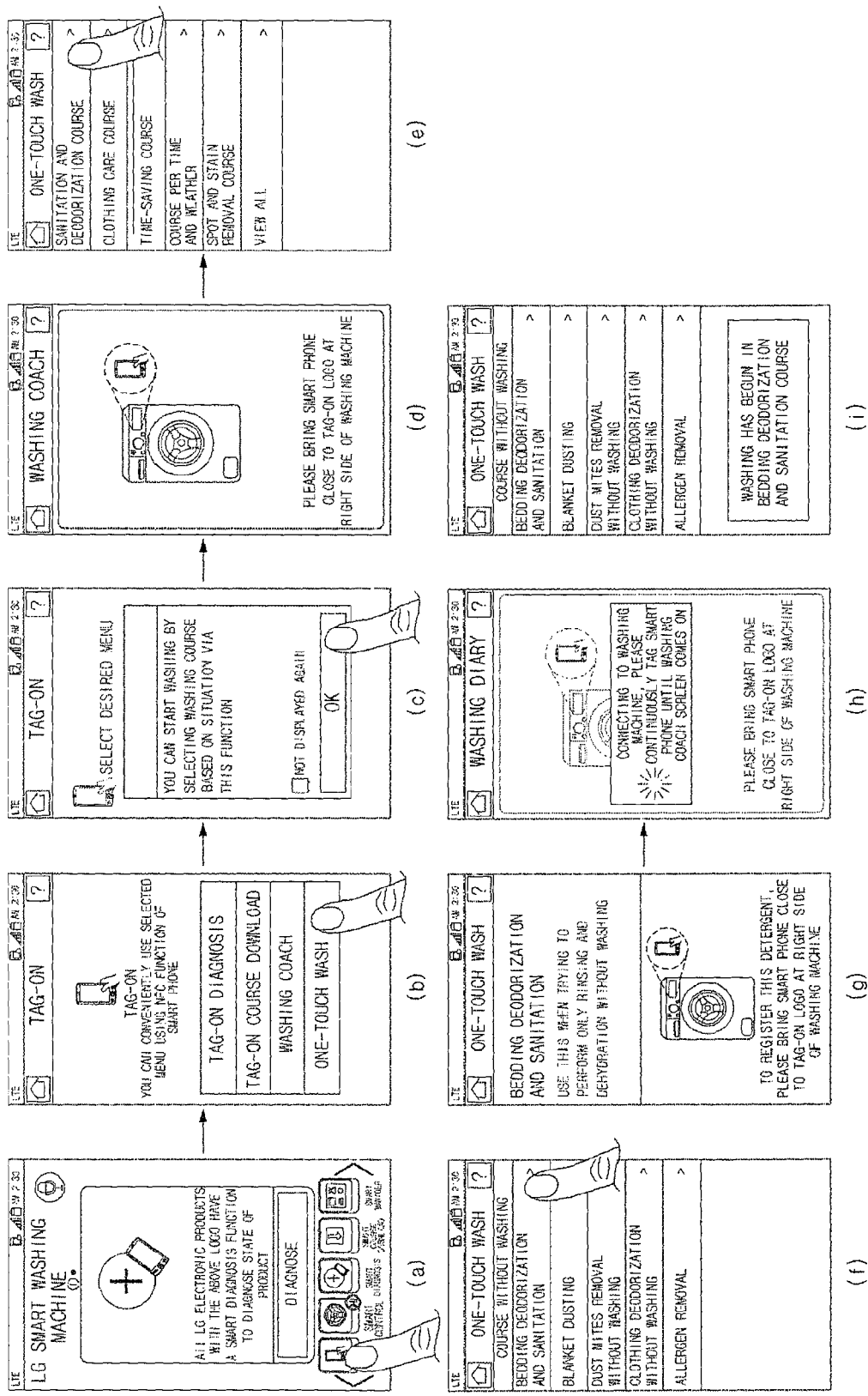
FIGS. 18 and 19 are views explaining a method of controlling the washing machine using the mobile terminal according to an embodiment of the present invention.
Figure 19:
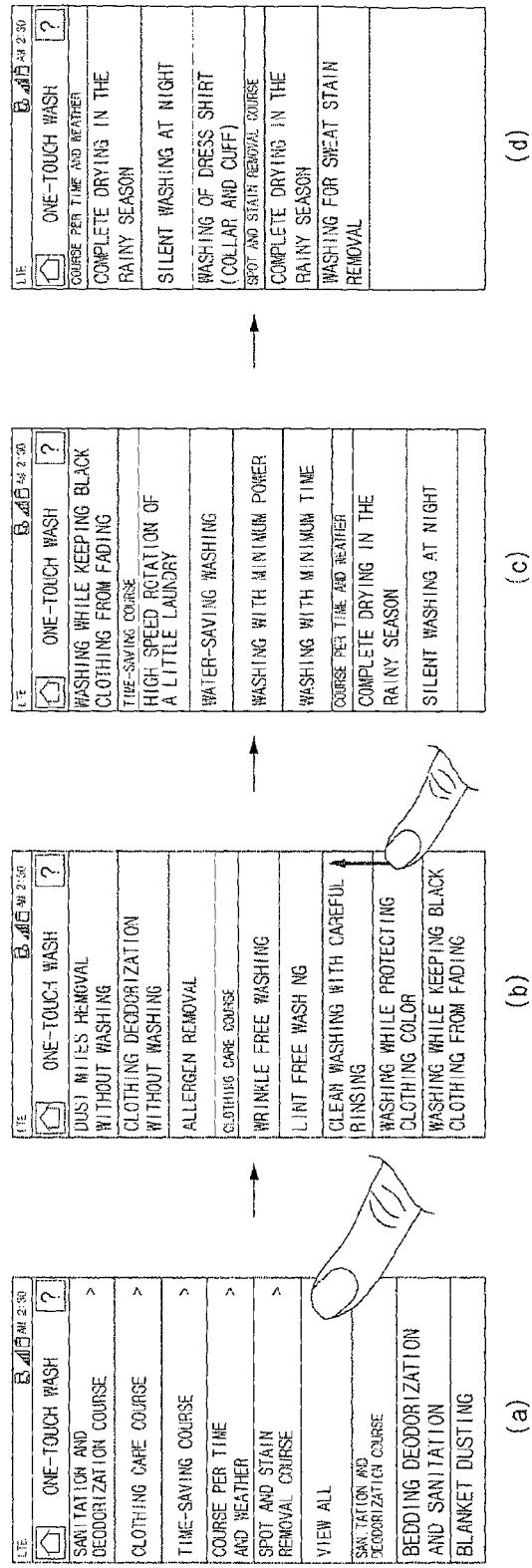

FIGS. 18 and 19 are views explaining a method of controlling the washing machine using the mobile terminal according to an embodiment of the present invention.

FIG. 18 is a view showing examples of screens output on the display unit 240 when the mobile terminal 2 controls operation of the washing machine 1 based on one-touch washing.

Referring to FIG. 18, the mobile terminal 2 executes an application that provides a control, diagnosis or use guide function for a home appliance. As exemplarily shown in FIG. 18(*a*), upon execution of the aforementioned application, the mobile terminal 2 displays prescribed menu icons to initiate washing machine control ("tag-on"), washing machine remote control ("smart remote control"), washing machine diagnosis ("smart diagnosis"), washing course download ("smart course download") and washing machine setting ("smart manager") via contact with the tag unit 140 of the washing machine 1.

Upon selection of the icon for washing machine control ("tag-on") via contact between the mobile terminal 2 and the tag unit 140 of the washing machine 1, as exemplarily shown in FIG. 18(*b*), the mobile terminal 2 displays menus named "tag-on diagnosis", "tag-on course download", "washing coach" and "one-touch washing". In addition, the mobile terminal 2 displays an explanation sentence of a tag-on function.

Upon selection of the menu named "one-touch washing", as exemplarily shown in FIG. 18(*c*), the mobile terminal 2 displays an explanation sentence of the menu named "one-touch washing" in a pop-up window.

Upon reception of touch input to "ok", as exemplarily shown in FIG. 18(*d*), the mobile terminal 2 displays a screen that gives an explanation of a method of tagging between the mobile terminal 2 and the tag unit 140 included in the washing machine 1.

During tagging between the mobile terminal 2 and the tag unit 140 included in the washing machine 1, the mobile terminal 2 may display a guide phrase and a mark, both of which indicate that the mobile terminal 2 is trying to connect to the washing machine 1.

In this case, the mobile terminal 2 receives information of the washing machine 1 via tagging with the tag unit 140 included in the washing machine 1 based on near field communication. Here, the information of the washing machine 1 may include categories and items based on the kind of the washing machine 1. For example, when a first washing machine has a first category and a first item and a second washing machine has a second category and a second item, the mobile terminal 2 may receive the first category and the first item upon tagging with the first washing machine.

After completion of tagging, as exemplarily shown in FIG. 18(*e*), the mobile terminal 2 displays a one-touch washing screen. In this case, the one-touch washing screen may provide categories named "sanitation and deodorization course", "clothing care course", "time-saving course", "course per time and weather", "spot and stain removal course" and "view all". Here, category selection is one embodiment of selection of an operating mode of the home appliance as described above in connection with Step S240 of FIG. 6.

Upon reception of touch input to the category named "sanitation and deodorization course" among the aforementioned categories, as exemplarily shown in FIG. 18(*f*), the mobile terminal 2 displays items of the category named "sanitation and deodorization course". The items of the category named "sanitation and deodorization course" may include "bedding deodorization and sanitation", "blanket dusting", "clothing deodorization and sanitation" and "allergen removal". The mobile terminal 2 receives touch input to the item named "bedding deodorization and sanitation".

Upon reception of touch input to the item named "bedding deodorization and sanitation", the mobile terminal 2 may display a screen that gives an explanation of a method of tagging between the mobile terminal 2 and the tag unit 140 included in the washing machine 1.

During tagging between the mobile terminal 2 and the tag unit 140 included in the washing machine 1, as exemplarily shown in FIG. 18(*g*), the mobile terminal 2 displays a guide phrase and a mark, both of which indicate that the mobile terminal 2 is trying to connect to the washing machine 1. In this case, the mobile terminal 2 may transmit an operating command to control operation of the washing machine 1 based on a selected operating mode via tagging with the tag unit 140 included in the washing machine 1 based on near field communication. For example, the mobile terminal 2 may transmit an operating command to perform washing based on the item named "bedding deodorization and sanitation" of the category named "sanitation and deodorization course".

After completion of tagging, as exemplarily shown in FIG. 18(*i*), in a state in which the category or item with regard to one-touch washing is displayed, the mobile terminal 2 displays a guide phrase indicating that washing has begun based on the item named "bedding deodorization and sanitation" in a pop-up window. The mobile terminal 2 displays the pop-up window for a predetermined time (e.g., 3 seconds).

FIG. 19 is a view showing examples of screens output on the display unit 240 when the mobile terminal 2 displays all courses with regard to one-touch washing based on selection of the item named "view all".

As exemplarily shown in FIG. 19(*a*), the mobile terminal 2 receives touch input to the item named "view all" in a state in which a one-touch washing screen is displayed. In this case, as exemplarily shown in FIGS. 19(*a*) to 19(*d*), the mobile terminal 2 displays several categories and items of the respective categories. That is, with regard to a category named "sanitation and deodorization course", items named "bedding deodorization and sanitation", "blanket dusting", "clothing deodorization without washing" and "allergen removal" are displayed.

In addition, with regard to the category named "clothing care course", items named "wrinkle free washing". "lint free washing" and "clean washing with careful rinsing" are displayed.

In addition, with regard to the category named "time-saving course", items named "washing of a little laundry", "washing with minimum power" and "washing with minimum time" are displayed.

In addition, with regard to the category named "course per time and weather", an item named "complete drying in the rainy season" is displayed.

In addition, with regard to the category named "spot and stain removal course", items named "washing of dress shirt (collar and cuff)" and "washing for sweat stain removal" are displayed.

When the entire display screen to be displayed upon selection of the item named "view all" is not displayed on the display unit 240 of the mobile terminal 2, the mobile terminal 2 may successively display the display screen corresponding to the item named "view all" upon receiving user flicking input.

As is apparent from the above description, the embodiments of the present invention have one or more of the following effects.

Firstly, data transmission/reception between a mobile terminal and a home appliance based on near field communication is possible, which may provide easy checking of information of the home appliance.

Secondly, setting of the home appliance may be changed via tagging with the mobile terminal that provides a more intuitive and improved interface, which may provide easy control of the home appliance without complicated key operation.

Thirdly, the mobile terminal may be used to check information of the home appliance, such as, for example, a use history of the home appliance, a state of the home appliance and repair/maintenance time of the home appliance, which may maximize user convenience.

Effects of the present invention should not be limited to the aforementioned objects and other not-mentioned effects will be clearly understood by those skilled in the art from the following claims.

Although all elements constituting the embodiments of the present invention are described to be integrated into a single one or to be operated as a single one, the present invention is not necessarily limited to such embodiments. In some embodiments, all of the elements may be selectively integrated into one or more and be operated as one or more within the object and the scope of the present invention.

Each of the elements may be implemented as independent hardware. Alternatively, some or all of the elements may be selectively combined into a computer program having a program module performing some or all functions combined in one or more pieces of hardware.

A plurality of codes and code segments constituting the computer program may be easily reasoned by those skilled in the art to which the present invention pertains. The computer program may be stored in a computer readable media such that the computer program is read and executed by a computer to implement embodiments of the present invention. Computer program storage media may include magnetic recording media, optical recording media, and carrier wave media.

The term "comprises", "includes", or "has" described herein should be interpreted not to exclude other elements but to further include such other elements since the corresponding elements may be inherent unless mentioned otherwise.

All terms including technical or scientific terms have the same meanings as generally understood by a person having ordinary skill in the art to which the present invention pertains unless mentioned otherwise.

Generally used terms, such as terms defined in a dictionary, should be interpreted to coincide with meanings of the related art from the context. Unless obviously defined in the present invention, such terms are not interpreted as ideal or excessively formal meanings.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

The embodiments disclosed in the present invention are provided not to limit the technical concept of the present invention but to illustrate the technical concept of the present invention. Therefore, the scope of the technical concept of the present invention is not limited by such embodiments. The scope of the protection of the present invention should be determined by reasonable interpretation of the appended claims and all technical concepts coming within the equivalency range of the present invention are should be interpreted to be embraced in the scope of the right of the present invention.

The invention claimed is:

1. A mobile terminal comprising:
a tag communication module configured to perform data transmission/reception via tagging with a tag unit included in a washing machine, wherein tagging is based on near field communication (NFC);
a display unit configured to display a menu related to the washing machine; and
a terminal controller configured to:
transmit a washing information request signal to the washing machine via the tag communication module upon a first tagging;
receive washing information from the washing machine via the tag communication module upon the first tagging;
display the washing information;
select an operating mode of the washing machine based on the washing information; and
transmit an operating command based on the operating mode to the washing machine via the tag communication module upon a second tagging.

2. The mobile terminal according to claim 1,
wherein a washing diary includes an operation history, a high frequency course, and a last used course,
wherein the washing information includes the washing diary and a tub wash notification,
wherein the tub wash notification provides information regarding a time to wash a tub, a tub wash method, and a tub wash history,
wherein the terminal controller displays a screen that gives an explanation of a method of the first tagging and the second tagging.

3. The mobile terminal according to claim 1, wherein the washing information includes information regarding an operation history of the washing machine, and
wherein the terminal controller is configured to:
control display of an operation history screen, including the information regarding the operation history of the washing machine, on the display unit; and
control selection of a washing course in response to user input received via touch to the operation history screen.

4. The mobile terminal according to claim 3, wherein the operation history screen includes information regarding a washing course use history of the washing machine, information regarding a high frequency washing course, and information regarding the last used washing course.

5. The mobile terminal according to claim 1, wherein the washing information includes information regarding detergent usable in the washing machine, and
wherein the terminal controller is configured to:
control display of a detergent registration screen on the display unit, the detergent registration screen being used to register detergent to be used in the washing machine; and
control registration of the detergent to be used in response to user input received via touch to the detergent registration screen.

6. The mobile terminal according to claim 1, wherein the washing information includes information regarding the amount of detergent to be input based on the amount of laundry sensed by the washing machine, and
wherein the terminal controller is configured to control display of a detergent addition message on the display unit, the message notifying addition of detergent when the amount of previously input detergent is insufficient as compared to the amount of laundry.

7. The mobile terminal according to claim 1, wherein the washing information includes information regarding a washing history of a tub included in the washing machine, and
wherein the terminal controller is configured to:
control display of a tub wash screen, giving an explanation of a tub wash method, on the display unit; and
select a tub wash operation in response to user input received via touch to the tub wash screen.

8. The mobile terminal according to claim 1, wherein the washing information includes model information of the washing machine, and
wherein the terminal controller is configured to:
control display of one or more washing courses based on the model information on the display unit;
control display of one or more sub items of a selected washing course on the display unit when any one of the washing courses is selected; and
select any one of the sub items in response to user input.

9. The mobile terminal according to claim 8, wherein the washing courses include a sanitation and deodorization course to remove odor and bacteria from laundry, a clothing care course for washing to reduce damage to laundry, a time-saving course for washing to minimize time or power, a course per time and weather for washing suitable for a prescribed time zone or weather, and a spot and stain removal course for washing focusing on a prescribed region of laundry.

10. A method of operating a mobile terminal, wherein the mobile terminal includes a tag communication module configured to perform data transmission/reception via tagging with a tag unit included in a washing machine, wherein tagging is based on near field communication(NFC), the method comprising:
transmitting a washing information request signal to the washing machine via the tag communication module upon a first tagging;

receiving washing information from the washing machine via the tag communication module upon the first tagging;

displaying the washing information;

selecting an operating mode of the washing machine based on the washing information; and transmitting an operating command based on the operating mode of the washing machine via the tag communication module upon a second tagging.

11. The method according to claim 10,
the method further comprising:

displaying a screen that gives an explanation of a method of the first tagging; and displaying a screen that gives an explanation of a method of the second tagging, wherein the washing information includes a washing diary and a tub wash notification, wherein the washing diary includes an operation history, a high frequency course, and the last used course, wherein the tub wash notification provides information regarding a time to wash a tub, a tub wash method, and a tub wash history.

12. The method according to claim 10,
wherein the selecting an operating mode of the washing machine includes:

displaying an operation history screen including information regarding an operation history of the washing machine; and selecting a washing course upon receiving user input to the operation history screen.

13. The method according to claim 12, wherein the operation history screen includes information regarding a washing course use history of the washing machine, information regarding a high frequency washing course, and information regarding a last used washing course.

14. The method according to claim 10, wherein the information of the home appliance is information regarding detergent usable in the washing machine, and
wherein the selecting includes:

displaying a detergent registration screen to register detergent to be used in the washing machine; and registering the detergent to be used upon receiving user input to the detergent registration screen.

15. The method according to claim 10, wherein the washing information includes information regarding an amount of detergent to be input based on an amount of laundry sensed by the washing machine, and wherein the method further comprises displaying a message to notify addition of detergent when an amount of previously input detergent is insufficient as compared to the amount of laundry.

16. The method according to claim 10, wherein the washing information includes information regarding a washing history of a tub included in the washing machine, and
wherein the selecting includes:

displaying a tub wash screen giving an explanation of a tub wash method; and selecting a tub wash operation upon receiving user input to the tub wash screen.

17. The method according to claim 10, wherein the washing information includes model information of the washing machine, and
wherein the selecting includes:

providing one or more washing courses based on the model information;

providing one or more sub items of a selected washing course when any one of the washing courses is selected; and selecting any one of the sub items.

18. The method according to claim 17, wherein the washing courses include a sanitation and deodorization course to remove odor and bacteria from laundry, a clothing care course for washing to reduce damage to laundry, a time-saving course for washing to minimize time or power, a course per time and weather for washing suitable for a prescribed time zone or weather, and a spot and stain removal course for washing focusing on a prescribed region of laundry.

19. A home appliance system comprising:

a washing machine including a tag unit configured to perform data transmission/reception and a mobile terminal of claim 1.

20. The system according to claim 19, wherein a washing diary includes an operation history, a high frequency course, and a last used course, wherein the washing information includes the washing diary and a tub wash notification, wherein the tub wash notification provides information regarding a time to wash a tub, a tub wash method, and a tub wash history, wherein the terminal controller displays a screen that gives an explanation of a method of the first tagging and the second tagging.

* * * * *